(12) United States Patent
Cherian et al.

(10) Patent No.: US 11,349,631 B2
(45) Date of Patent: May 31, 2022

(54) TECHNIQUES FOR PROVIDING FULL-DUPLEX COMMUNICATIONS IN WIRELESS RADIO ACCESS TECHNOLOGIES

(71) Applicant: QUALCOMM Incorporated, San Diego, CA (US)

(72) Inventors: George Cherian, San Diego, CA (US); Alfred Asterjadhi, San Diego, CA (US); Simone Merlin, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 16/361,571

(22) Filed: Mar. 22, 2019

(65) Prior Publication Data

US 2019/0296885 A1   Sep. 26, 2019

Related U.S. Application Data

(60) Provisional application No. 62/648,169, filed on Mar. 26, 2018.

(51) Int. Cl.
*H04L 5/14* (2006.01)
*H04L 1/00* (2006.01)
(Continued)

(52) U.S. Cl.
CPC .......... *H04L 5/1453* (2013.01); *H04L 1/0003* (2013.01); *H04L 5/143* (2013.01);
(Continued)

(58) Field of Classification Search
CPC ... H04L 1/0003; H04L 1/0009; H04L 1/1887; H04L 5/006; H04L 5/0091; H04L 5/14;
(Continued)

(56) References Cited

U.S. PATENT DOCUMENTS

2002/0196766 A1* 12/2002 Hwang ................. H04W 52/56
370/342
2014/0024388 A1* 1/2014 Earnshaw ............. H04L 5/0073
455/452.2

(Continued)

FOREIGN PATENT DOCUMENTS

WO    2016167434 A1    10/2016

OTHER PUBLICATIONS

International Search Report and Written Opinion—PCT/US2019/023905—ISA/EPO—dated May 21, 2019.

*Primary Examiner* — Melvin C Marcelo
(74) *Attorney, Agent, or Firm* — Arent Fox LLP

(57) ABSTRACT

Aspects of the present disclosure relate to receiving, at a first node and from a second node configured for full-duplex wireless communications, a signal indicating an interference floor for receiving signals at the second node, wherein the interference floor is based on interference caused by a transmitter of the second node, determining, by the first node and based at least in part on the interference floor, a modulation and coding scheme (MCS) for transmitting one or more signals to the second node, and transmitting, by the first node and based on the MCS, the one or more signals to the second node.

41 Claims, 14 Drawing Sheets

(51) Int. Cl.
*H04W 72/08* (2009.01)
*H04W 24/06* (2009.01)
*H04W 80/02* (2009.01)

(52) U.S. Cl.
CPC ........... *H04L 5/1461* (2013.01); *H04W 24/06* (2013.01); *H04W 72/082* (2013.01); *H04W 80/02* (2013.01); *H04L 1/0009* (2013.01)

(58) Field of Classification Search
CPC ..... H04L 5/143; H04L 5/1453; H04L 5/1461; H04W 24/06; H04W 72/082; H04W 80/02
USPC ........................................................ 370/329
See application file for complete search history.

(56) References Cited

U.S. PATENT DOCUMENTS

| | | | |
|---|---|---|---|
| 2015/0172038 A1* | 6/2015 | Jiang | H04L 27/0006 370/280 |
| 2016/0020894 A1* | 1/2016 | Tetzlaff | H04L 1/0003 370/278 |
| 2016/0219024 A1* | 7/2016 | Verzun | H04L 9/0662 |
| 2016/0233998 A1* | 8/2016 | Sun | H04B 17/345 |
| 2017/0033916 A1 | 2/2017 | Stirling-Gallacher et al. | |
| 2017/0208625 A1* | 7/2017 | Choi | H04W 72/085 |
| 2018/0084506 A1 | 3/2018 | Min et al. | |
| 2018/0123710 A1 | 5/2018 | Kim et al. | |

\* cited by examiner

TECHNIQUES FOR PROVIDING FULL-DUPLEX COMMUNICATIONS IN WIRELESS RADIO ACCESS TECHNOLOGIES

CLAIM OF PRIORITY UNDER 35 U.S.C. § 119

The present Application for Patent claims priority to Provisional Application No. 62/648,169, entitled "TECHNIQUES FOR PROVIDING FULL-DUPLEX COMMUNICATIONS IN WIRELESS RADIO ACCESS TECHNOLOGIES" filed Mar. 26, 2018, which is assigned to the assignee hereof and hereby expressly incorporated by reference herein for all purposes.

BACKGROUND

The present disclosure relates generally to telecommunications, and more specifically to supporting full-duplex communications by one or more nodes in a network that uses a wireless radio access technology (RAT).

The deployment of wireless local area networks (WLANs) in the home, the office, and various public facilities is commonplace today. Such networks typically employ a wireless access point (AP) that connects a number of wireless stations (STAs) in a specific locality (e.g., home, office, public facility, etc.) to another network, such as the Internet or the like. In a wireless communications system, an AP may provide a STA with access to the communication system or network. Communication on the wireless interface between the STA and the AP can be based on an appropriate communication protocol and/or RAT, such as an Institute of Electrical and Electronics Engineers (IEEE) 802.11 compliant RAT. Such RATs typically employ a clear channel assessment (CCA) mechanism performed by the APs and STAs to assess when a channel is clear for sending communications to other nodes in the network. In this regard, communications via the network are typically half-duplex, which may be less efficient than other modes of communication by allowing only one node to access the channel at a given point in time.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one example, a method for wireless communication is provided. The method includes receiving, at a first node and from a second node configured for full-duplex wireless communications, a signal indicating an interference floor for receiving signals at the second node, where the interference floor is based on interference caused by a transmitter of the second node, determining, by the first node and based at least in part on the interference floor, a modulation and coding scheme (MCS) for transmitting one or more signals to the second node, and transmitting, by the first node and based on the MCS, the one or more signals to the second node.

In another example, a method for wireless communication is provided that includes transmitting, from a second node configured for full-duplex wireless communications and to a first node, a signal indicating an interference floor for receiving signals at the second node, wherein the interference floor is based on interference caused by a transmitter of the second node, and receiving, from the first node and based at least in part on the signal, one or more signals having a MCS selected based at least in part on the interference floor.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In one example, an apparatus for wireless communication is provided that includes a transceiver, a memory configured to store instructions, and one or more processors communicatively coupled with the transceiver and the memory. The one or more processors are configured to receive, from a node configured for full-duplex wireless communications, a signal indicating an interference floor for receiving signals at the node, wherein the interference floor is based on interference caused by a transmitter of the node, determine, based at least in part on the interference floor, a MCS for transmitting one or more signals to the node, and transmit, based on the MCS, the one or more signals to the node.

In another example, an apparatus for wireless communication is provided that includes a transceiver, a memory configured to store instructions, and one or more processors communicatively coupled with the transceiver and the memory. The one or more processors are configured to transmit, based on a configuration for full-duplex wireless communications and to a first node, a signal indicating an interference floor for receiving signals at the apparatus, wherein the interference floor is based on interference caused by a transmitter of the transceiver, and receive, from the first node and based at least in part on the signal, one or more signals having a modulation and coding scheme (MCS) selected based at least in part on the interference floor.

In another example, an apparatus for wireless communication is provided that includes means for receiving, from a node configured for full-duplex wireless communications, a signal indicating an interference floor for receiving signals at the node, wherein the interference floor is based on interference caused by a transmitter of the node, means for determining, based at least in part on the interference floor, a MCS for transmitting one or more signals to the node, and means for transmitting, based on the MCS, the one or more signals to the node.

In another example, an apparatus for wireless communication is provided that includes means for transmitting, based on a configuration for full-duplex wireless communications and to a first node, a signal indicating an interference floor for receiving signals at the apparatus, wherein the interference floor is based on interference caused by a transmitter of the transceiver, and means for receiving, from the first node and based at least in part on the signal, one or more signals having a modulation and coding scheme (MCS) selected based at least in part on the interference floor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Figure 1:
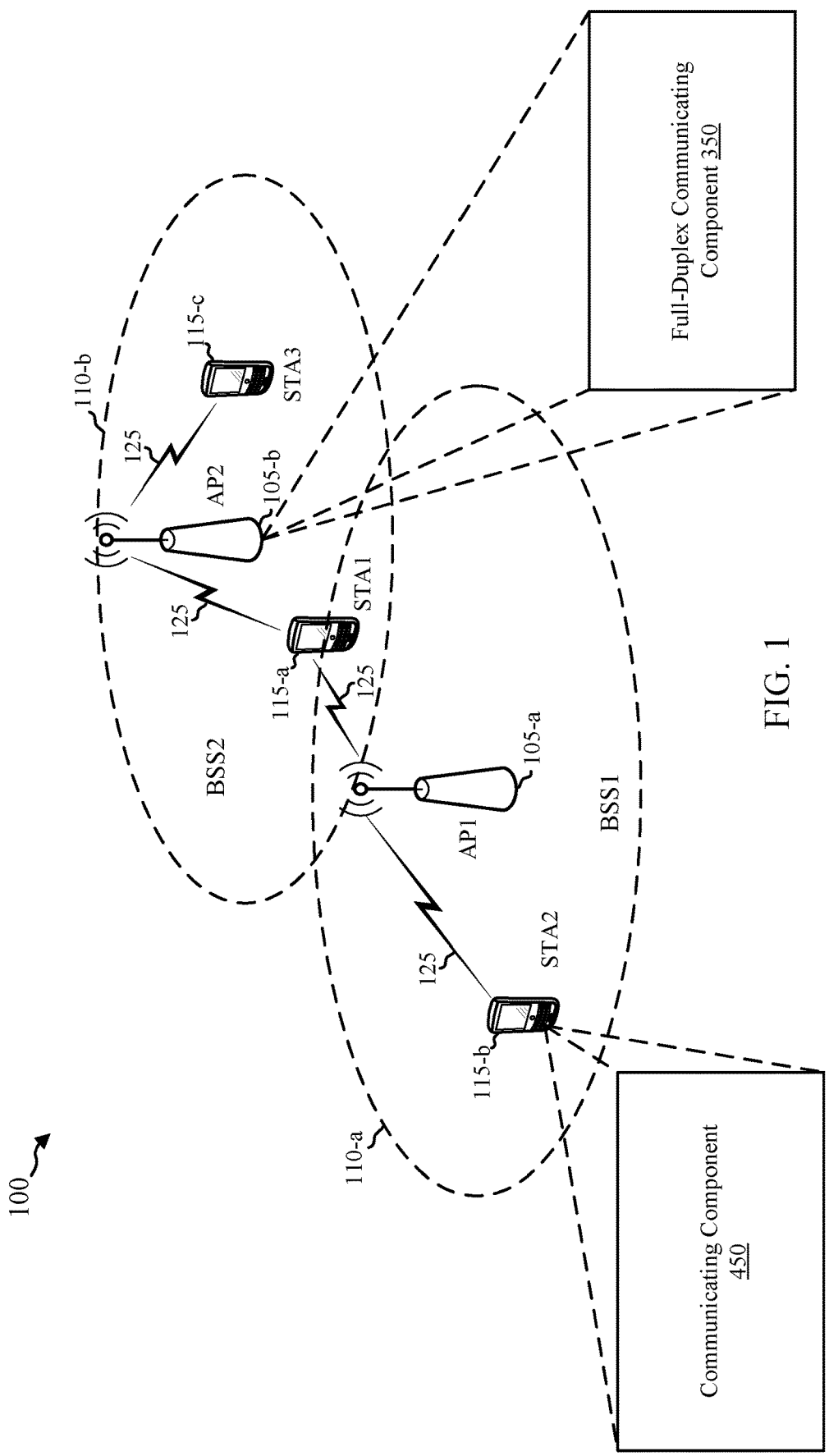
FIG. 1 is a conceptual diagram illustrating an example of a wireless local area network (WLAN) deployment.

Aspects of the present disclosure generally relate to supporting full-duplex communications in wireless radio access technologies (RATs). The wireless RAT(s) over which full-duplex communications may be supported may include RAT(s) that typically use channel access mechanisms to determine whether a channel is available (e.g., free from interference of another node transmitting in the network) prior to transmitting communications. In this regard, such RAT(s) may have previously been used in a half-duplex operation mode. Aspects described herein relate to implementing full-duplex support in such networks using one or more configurations. In one example, a first configuration may be defined where access points (APs) may support full-duplex communications, while mobile stations (STAs) that communicate with the APs may not support full-duplex communications. In another example, a second configuration may be defined where both APs and STAs support full-duplex communications. Various considerations provided herein can provide solutions for carrier sensing and channel access consideration, channel access sequences, and/or managing interference between STAs for one or both of these configurations (and/or other configurations for providing full-duplex communications). For example, in the first configuration where the AP supports full-duplex but a given STA does not support full-duplex, the AP may schedule communications for the STA or the STA can communicate without being scheduled. Similarly, in the second configuration where the AP and STA support full-duplex, the AP may schedule communications for the STA or the STA can communicate without being scheduled. Each of these scenarios may present additional considerations for carrier sensing and channel access, channel access sequences, and/or managing interference between STAs, as described further herein.

In examples described herein, a device transmitting a primary physical layer convergence procedure (PLCP) protocol data unit (PPDU) can include information regarding an interference floor related to interference caused by the primary (or forward) PPDU at the full-duplex receiver. For example, a primary or forward PPDU, as used herein, can refer to a PPDU transmitted by a node, which may include a downlink transmission from an AP, or an uplink transmission from a STA. In addition, a secondary or reverse PPDU can refer to a PPDU transmitted by a different node in response to the primary PPDU from the node, which may include an uplink transmission from a STA in response to a downlink primary PPDU transmission from an AP, or a downlink transmission from an AP in response to an uplink primary PPDU transmission from a STA. In any case, the device that transmits the secondary PPDU can adjust one or more parameters for transmitting the second PPDU, such as a modulation and coding scheme (MCS), based at least in part on the interference floor to improve likelihood of receiving the secondary PPDU by the device that transmitted the primary PPDU, where the device that receives the secondary PPDU may also be transmitting communications in full-duplex. The primary PPDU can indicate additional parameters that may be used for determining parameters for transmitting the secondary PPDU, such as whether the PPDU is a full-duplex transmission, whether a full-duplex secondary PPDU is allowed, whether the secondary PPDU is limited to the device that receives the primary PPDU or other information regarding other devices that may transmit the secondary PPDU, etc. In one example, where a STA transmits communications without being scheduled, the STA can use the interference floor in a primary PPDU from an AP in adjusting parameters for performing a CCA before transmitting communications to the AP.

In addition, for example, an AP can define channel access mechanisms to access the channel from communicating using full-duplex and/or allowing half-duplex or full-duplex UEs to access the channel. Moreover, the AP can define a procedure for managing interference in full-duplex communications, which may include grouping STAs for full duplex transmission, indicating to STAs to transmit reference signals that can be measured by neighboring STAs (e.g., in the group), requesting the STA(s) to report interference or signal energy measured of the neighboring STAs, etc. In these examples, the AP can communicate with STAs using full-duplex based on an Institute of Electrical and Electronics Engineers (IEEE) 802.11 compliant RAT and/or the STAs may enable full-duplex as well in some examples.

Various concepts will now be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details. However, it will be apparent to those skilled in the art that these concepts may be practiced without these specific details. In some instances, well known structures and components are shown in block diagram form in order to avoid obscuring the various concepts presented throughout this disclosure.

FIG. 1 is a conceptual diagram 100 illustrating an example of a wireless local area network (WLAN) deployment in connection with various techniques described herein. The WLAN may include one or more access points (APs) 105 and one or more mobile stations (STAs) 115 associated with a respective AP. In this example, there are two APs deployed: AP1 105-a in basic service set 1 (BSS1) and AP2 105-b in BSS2, which may be referred to as an overlapping BSS (OBSS). AP1 105-a is shown as having at least two associated STAs (STA1 115-a and STA2 115-b) and coverage area 110-a, while AP2 105-b is shown having at least two associated STAs (STA1 115-a and STA3 115-c) and coverage area 110-b. The STAs and AP associated with a particular BSS may be referred to as members of that BSS. In the example of FIG. 1, the coverage area of AP1 105-a may overlap part of the coverage area of AP2 105-b such that STA1 115-a may be within the overlapping portion of the coverage areas. The number of BSSs, APs, and STAs, and the coverage areas of the APs described in connection with the WLAN deployment of FIG. 1 are provided by way of illustration and not of limitation.

In some examples, the APs (e.g., AP1 105-a and AP2 105-b) shown in FIG. 1 can be fixed terminals that can provide backhaul services to STAs 115 within its coverage area or region (e.g., to facilitate connection to a backend network). In some applications, however, the AP may be a mobile or non-fixed terminal. The AP 105 may include a full-duplex communicating component 350 (see FIG. 3) for communicating with one or more half-duplex or full-duplex STAs 115, as described herein. In some examples, the full-duplex communicating component 350 can transmit signals indicating interference floor to allow receiving STAs 115 to determine one or more parameters (e.g., MCS) for transmitting signals in response. In other examples, the communicating component 350 can indicate other information in the signals as well, can transmit the signal based on receiving a clear-to-send, can perform energy detection to determine parameters for transmitting the signal, can request measurement reporting, and/or can perform various other functions, as described further herein.

The STAs (e.g., STA1 115-a, STA2 115-b and STA3 115-c) shown in FIG. 1, which may be fixed, non-fixed, or mobile terminals, utilize the backhaul services of their respective AP to connect to a network, such as the Internet. Examples of an STA include, but are not limited to: a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or any other suitable wireless apparatus requiring the backhaul services of an AP. An STA may also be referred to by those skilled in the art as: a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, user equipment (UE), or some other suitable terminology. An AP may also be referred to as: a base station, a base transceiver station, a radio base station, a radio transceiver, a transceiver function, or any other suitable terminology. The various concepts described throughout this disclosure are intended to apply to all suitable wireless apparatus regardless of their specific nomenclature.

Each of STA1 115-a, STA2 115-b, and STA3 115-c may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network. The STA 115 may include the communicating component 450 for receiving communications from and/or transmitting communications to a full-duplex AP 105. For example, the communicating component 450 can receive an indication of an interference floor from the AP 105, and can use the interference floor in determining one or more parameters for sending one or more signals to the AP 105, such as a MCS and/or other parameters. In other examples, communicating component 450 can receive a midamble from the AP 105 indicating a time for the STA 115 to transmit the one or more signals to the AP 105, can perform an energy detection to determine parameters for transmitting the one or more signals to the AP 105, can provide a clear-to-send to the AP 105 to transmit the signal, can transmit measurement signals and/or perform measurements for reporting to the AP 105, and/or can perform various other functions, as described further herein.

Each of AP1 105-a and AP2 105-b can include software applications and/or circuitry to enable associated STAs to connect to a network via communications link 125. The APs can send frames or packets to their respective STAs and receive frames or packets from their respective STAs to communicate data and/or control information (e.g., signaling). Each of AP1 105-a and AP2 105-b can establish a communications link 125 with an STA that is within the coverage area of the AP. Communications link 125 can comprise communications channels that can enable both uplink and downlink communications. When connecting to an AP, an STA can first authenticate itself with the AP and then associate itself with the AP. Once associated, a communications link 125 may be established between the AP 105 and the STA 115 such that the AP 105 and the associated STA 115 may exchange frames or messages through a direct communications channel. It should be noted that the wireless communication system, in some examples, may not have a central AP (e.g., AP 105), but rather may function as a peer-to-peer network between the STAs. Accordingly, the functions of the AP 105 described herein may alternatively be performed by one or more of the STAs 115.

In some examples, a STA (e.g., STA1 115-a) may be in vicinity of a plurality of APs (e.g., first AP 105-a that may be a serving AP) and a second AP 105-b that may be a potential target AP. At the edge of the coverage area 110-a of the first AP 105-a, the signal quality between the first AP 105-a and the STA1 115-a may deteriorate. In such situations, the STA 115-a may be better served by the second AP 105-*b*. However, conventional techniques where the STA 115-*a* may not support IEEE 802.11k/v functionality, the STA 115-*a* may not be able to communicate to the first AP 105-*a* the signal metric information between the second AP 105-*b* and the STA 115-*a*. Further, because the STA 115-*a* may maintain its connection with the first AP 105-*a*, the STA 115-*a* may suffer with signal quality.

While aspects of the present disclosure are described in connection with a WLAN deployment or the use of IEEE 802.11-compliant networks, those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. Thus, the various aspects presented throughout this disclosure for performing operations based on modifications and enhancements to dynamic sensitivity control may be applicable to any suitable wireless network regardless of the coverage range and the wireless access protocols utilized.

In some aspects, one or more APs (105-*a* and 105-*b*) may transmit on one or more channels (e.g., multiple narrowband channels, each channel including a frequency bandwidth) a beacon signal (or simply a "beacon"), via a communications link 125 to STA(s) 115 of the wireless communication system, which may help the STA(s) 115 to synchronize their timing with the APs 105, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, wireless devices (e.g., STA 115 and/or AP 105) may, in order to increase reuse of the spectrum, transmit on top of transmissions coming from an OBSS and refrain from transmitting on top of transmissions coming from the same BSS (also known as in-BSS). To enable a wireless device to determine whether a transmission is from the same BSS as the wireless device or from an OBSS, some packets may have a color code/information that identifies the BSS from which the packets originated, in some cases the BSSID field is also included along with BSS color. Color code/information may be a BSS identifier (BSSID) or a partial BSSID or separate value advertised by the AP. When the wireless device receives a packet with color information, the wireless device may determine if the packet is associated with the same BSS as the wireless device, and may therefore defer transmissions, or if the packet is associated with an OBSS, in which case the wireless device may reuse the spectrum.

Figure 2:
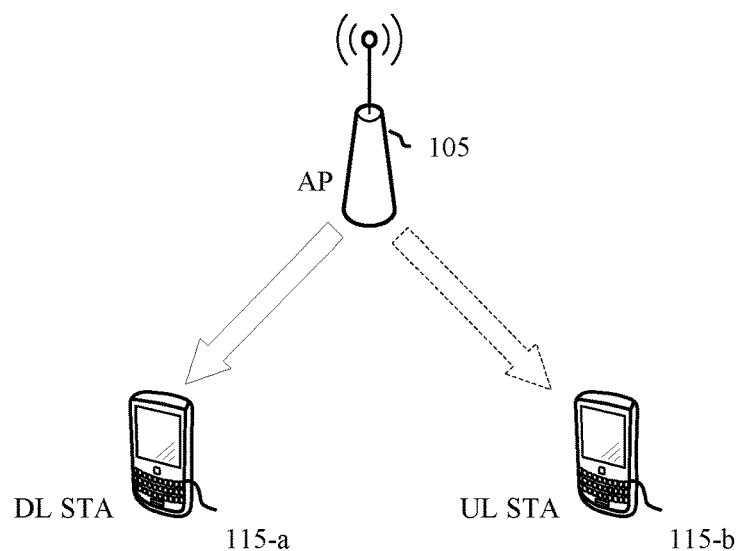
FIG. 2 is a conceptual diagram illustrating an example of a WLAN deployment using full-duplex communications.

FIG. 2 is a conceptual diagram 200 illustrating an example of a WLAN deployment in connection with various techniques described herein. The WLAN may include an AP 105 and STAs 115-*a* and 115-*b* associated with AP 105. For example, STA 115-*a* can be a downlink (DL) STA (e.g., a STA in a DL mode during a period of time) for receiving signals from AP 105, and STA 115-*b* can be an uplink (UL) STA (e.g., a half-duplex STA in UL mode during the period of time) for transmitting signals to the AP 105. As the AP 105 is full-duplex, it can transmit signals to DL STA 115-*a* while receiving signals from UL STA 115-*b*; however, UL STA 115-*b* may block transmission of signals to AP 105 based on detecting that the channel is not clear due to AP 105 transmitting to DL STA 115-*a*. For example, UL STA 115-*b* may perform a CCA that can fail based on detecting signal energy from the DL transmission of AP 105, or can otherwise receive a DL transmission from the AP 105 indicating that the channel is blocked (e.g., at least for a period of time). In this regard, for example, the AP 105 can transmit information in a DL transmission (e.g., a trigger signal) that the UL STA 115-*b* can also receive and determine parameters for transmitting a signal back to the AP 105. As described further herein, the information may include an interference floor at the AP 105 based on transmitting the DL transmission, which the UL STA 115-*b* can use to adjust one or more parameters for transmitting the signal to the AP 105, such as MCS, to account for interference when the AP 105 is also transmitting other signals when receiving the one or more signals from UL STA 115-*b* in full-duplex mode. In another example, the UL STA 115-*b* can adjust an energy detection threshold for performing CCA based on a DL transmission from the AP 105 such that a clear channel may be detected by the UL STA 115-*b* during CCA even when the AP 105 is transmitting a DL signal (e.g., to DL STA 115-*a*). AP 105 can transmit various other parameters to allow the UL STA 115-*b* to transmit to the AP 105 while the AP 105 may also transmit communications in full-duplex mode.

In one example, STAs 115 communicating with an AP 105 may be full-duplex, and may not encounter the situation of uplink transmissions being blocked based on detecting a channel being used by the AP 105 transmitting signals. In such examples, however, a full-duplex STA may continue to adjust energy detection to account for signals received from the AP 105, to select one or more parameters for transmitting communications, such as MCS, based on an interference floor for the AP 105, etc. such to allow for full-duplex communication with the AP 105. Similarly, for example, the AP 105 may also perform similar energy detection to account for signals received from the STA, to select one or more parameters for transmitting communications, such as MCS, based on an interference floor for the STA, etc., such to allow for full-duplex communication with the full-duplex STA.

Figure 3:
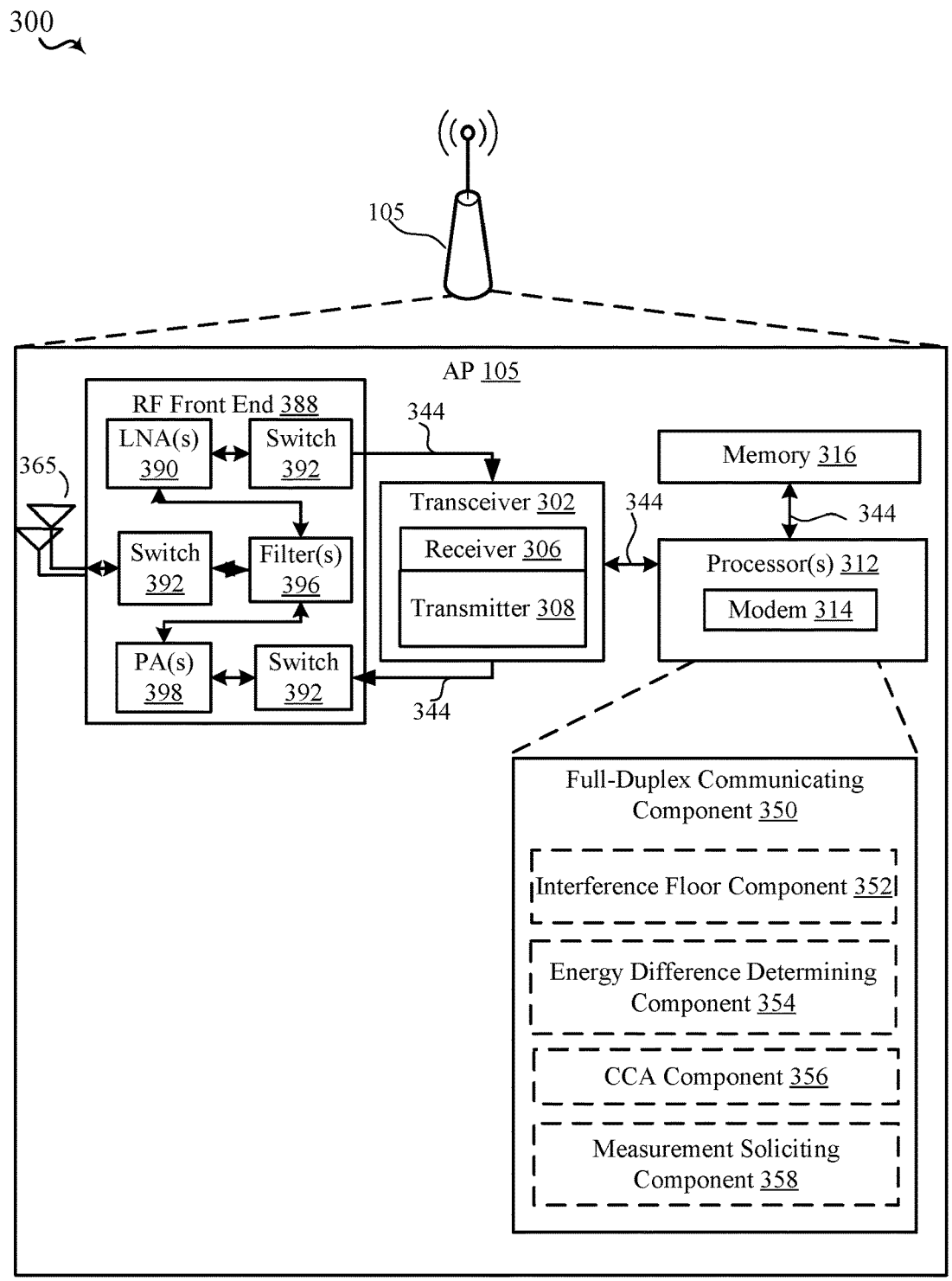
FIG. 3 is a schematic diagram of a device including an aspect of an access point (AP) that may implement various aspects of the present disclosure.

FIG. 3 describes hardware components and subcomponents of an AP 105 for implementing one or more methods described herein in accordance with various aspects of the present disclosure. The AP 105 may be an example of an AP described herein that can operate in full-duplex in communicating with one or more STAs.

One example of an implementation of AP 105 may include a variety of components, including components such as one or more processors 312 and memory 316 and transceiver 302 in communication via one or more buses 344, which may operate in conjunction with full-duplex communicating component 350 to enable one or more of the functions described herein related to including one or more methods of the present disclosure. Further, the one or more processors 312, modem 314, memory 316, transceiver 302, RF front end 388 and one or more antennas 365, may be configured to support voice and/or data calls (simultaneously or non-simultaneously) in one or more radio access technologies.

In an aspect, the one or more processors 312 can include a modem 314 that uses one or more modem processors. The various functions related to full-duplex communicating component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with full-duplex communicating component 350 may be performed by transceiver 302.

Also, memory 316 may be configured to store data used herein and/or local versions of applications or full-duplex communicating component 350 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining full-duplex communicating component 350 and/or one or more of its subcomponents, and/or data associated therewith, when AP 105 is operating at least one processor 312 to execute full-duplex communicating component 350 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one STA 115 or other APs 105. For example, the receiver 306 may receive a monitoring request from a serving AP. Additionally, receiver 306 may process such received signals, and also may obtain measurements of the signals, such as, but not limited to, Ec/Io, SNR, RSRP, RSSI, etc. Transmitter 308 may include hardware, firmware, and/or software code executable by a processor for transmitting data, the code comprising instructions and being stored in a memory (e.g., computer-readable medium). A suitable example of transceiver 302 may including, but is not limited to, an RF transmitter.

Moreover, in an aspect, AP 105 may include RF front end 388, which may operate in communication with one or more antennas 365 and transceiver 302 for receiving and transmitting radio transmissions, for example, wireless communications transmitted by at least one other AP 105 or wireless transmissions transmitted by STA 115. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that AP 105 can communicate with, for example, one or more STAs 115 or one or more cells associated with one or more AP 105. In an aspect, for example, modem 314 can configure transceiver 302 to operate at a specified frequency and power level based on the configuration of the AP 105 and the communication protocol used by modem 314.

In an aspect, modem 314 can be a multiband-multimode modem, which can process digital data and communicate with transceiver 302 such that the digital data is sent and received using transceiver 302. In an aspect, modem 314 can be multiband and be configured to support multiple frequency bands for a specific communications protocol. In an aspect, modem 314 can be multimode and be configured to support multiple operating networks and communications protocols. In an aspect, modem 314 can control one or more components of AP 105 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on configuration information associated with AP 105 as provided by the network during cell selection and/or cell reselection.

The full-duplex communicating component 350 can optionally include one or more components for providing functions described herein, such as an interference floor component 352 for reporting an interference floor to one or more STAs, where the interference floor can correspond to the interference floor caused in receiver 306 when receiving signals transmitted by transmitter 308, an energy difference determining component 354 for determining an energy difference caused by a transmission from a STA to adjust an energy difference threshold for performing CCA, a CCA component 356 for performing a CCA to detect a transmission opportunity (which may be based on the adjusted energy difference threshold), and/or a measurement soliciting component 358 for soliciting one or more STAs to transmit measurement signals and/or one or more STAs to measure measurement signals transmitted by one or more other STAs for reporting the measurements back to the AP 105.

Figure 4:
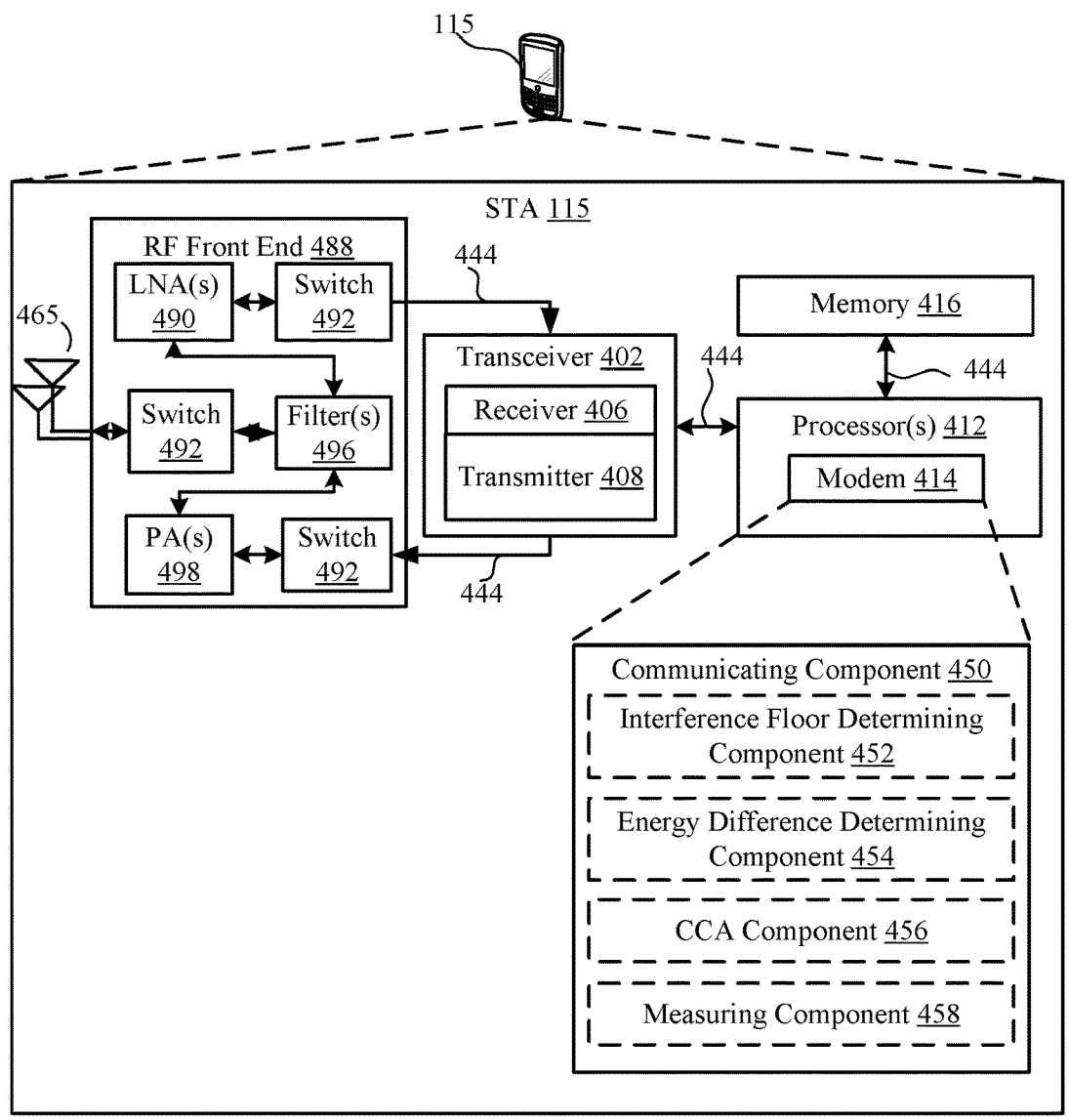
FIG. 4 is a schematic diagram of a device including an aspect of a mobile station (STA) that may implement various aspects of the present disclosure.

FIG. 4 describes hardware components and subcomponents of a STA 115 for implementing one or more methods described herein in accordance with various aspects of the present disclosure. The STA 115 may be an example of a STA described herein that can operate, in different examples, in half-duplex or full-duplex in communicating with a full-duplex AP 105.

One example of an implementation of STA 115 may include a variety of components, including components such as one or more processors 412 and memory 416 and transceiver 402 in communication via one or more buses 444, which may operate in conjunction with a communicating component 450 to enable one or more of the functions described herein related to including one or more methods of the present disclosure. Further, the one or more processors 412, modem 414, memory 416, transceiver 402, RF front end 488 and one or more antennas 465, may be configured to support voice and/or data calls (simultaneously or non-simultaneously) in one or more radio access technologies.

In an aspect, the one or more processors 412 can include a modem 414 that uses one or more modem processors. The various functions related to communicating component 450 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with communicating component 450 may be performed by transceiver 402.

Also, memory 416 may be configured to store data used herein and/or local versions of applications or communicating component 450 and/or one or more of its subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining communicating component 450 and/or one or more of its subcomponents, and/or data associated therewith, when STA 115 is operating at least one processor 412 to execute communicating component 450 and/or one or more of its subcomponents.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a radio frequency (RF) receiver. In an aspect, receiver 406 may receive signals transmitted by at least one STA 115 or other APs 105. Additionally, receiver 406 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transceiver 402 may including, but is not limited to, an RF transmitter.

Moreover, in an aspect, STA 115 may include RF front end 488, which may operate in communication with one or more antennas 465 and transceiver 402 for receiving and transmitting radio transmissions, for example, wireless communications transmitted by at least one other AP 105 or wireless transmissions transmitted by STA 115. RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, LNA 490 can amplify a received signal at a desired output level. In an aspect, each LNA 490 may have a specified minimum and maximum gain values. In an aspect, RF front end 488 may use one or more switches 492 to select a particular LNA 490 and its specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, RF front end 488 may use one or more switches 492 to select a particular PA 498 and its specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 465 via RF front end 488. In an aspect, transceiver may be tuned to operate at specified frequencies such that STA 115 can communicate with, for example, one or more STA 115 or one or more cells associated with one or more APs 105. In an aspect, for example, modem 414 can configure transceiver 402 to operate at a specified frequency and power level based on the configuration of the STA 115 and the communication protocol used by modem 414.

In an aspect, modem 414 can be a multiband-multimode modem, which can process digital data and communicate with transceiver 402 such that the digital data is sent and received using transceiver 402. In an aspect, modem 414 can be multiband and be configured to support multiple frequency bands for a specific communications protocol. In an aspect, modem 414 can be multimode and be configured to support multiple operating networks and communications protocols. In an aspect, modem 414 can control one or more components of STA 115 (e.g., RF front end 488, transceiver 402) to enable transmission and/or reception of signals from the network based on a specified modem configuration. In an aspect, the modem configuration can be based on the mode of the modem and the frequency band in use. In another aspect, the modem configuration can be based on configuration information associated with STA 115 as provided by the network during cell selection and/or cell reselection.

The communicating component 450 can include an interference floor determining component 452 for determining an interference floor associated with a node receiving one or more signals from the STA 115, such as an AP 105, which can allow for adjusting an MCS of the one or more signals. The communicating component 450 can also include an energy difference determining component 454 for determining an energy difference caused by a transmission from a STA to adjust an energy difference threshold for performing CCA, a CCA component 356 for performing a CCA to detect a transmission opportunity (which may be based on the adjusted energy difference threshold), and/or a measuring component 458 for transmitting measurement signals and/or measuring measurement signals transmitted by other STAs to report measurements to the AP 105 to facilitate interference management of STAs by the full-duplex AP 105.

Figure 5:
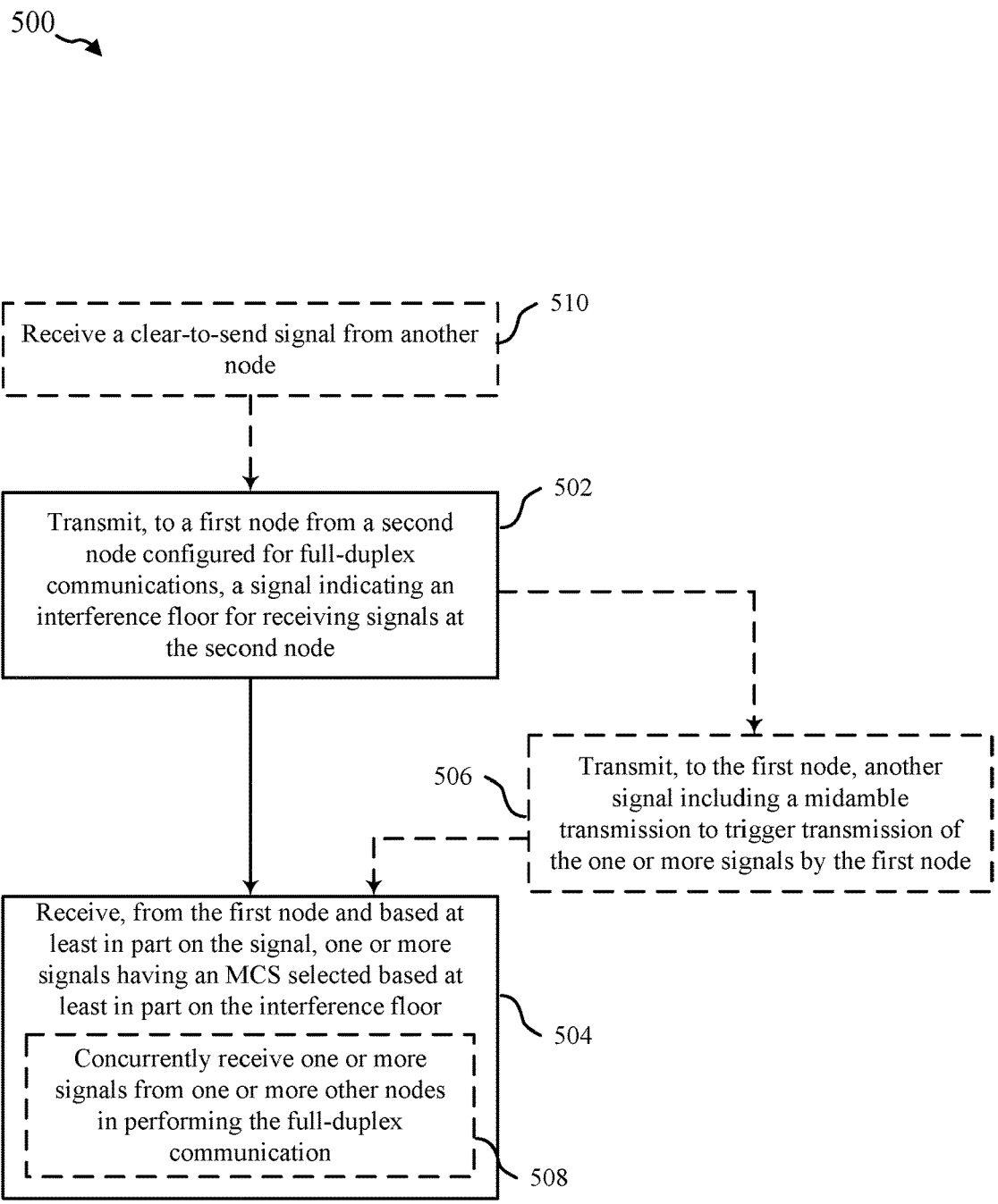
FIG. 5 illustrates an example of a flowchart for transmitting signals indicating interference floor in accordance with the present disclosure.
Figure 6:
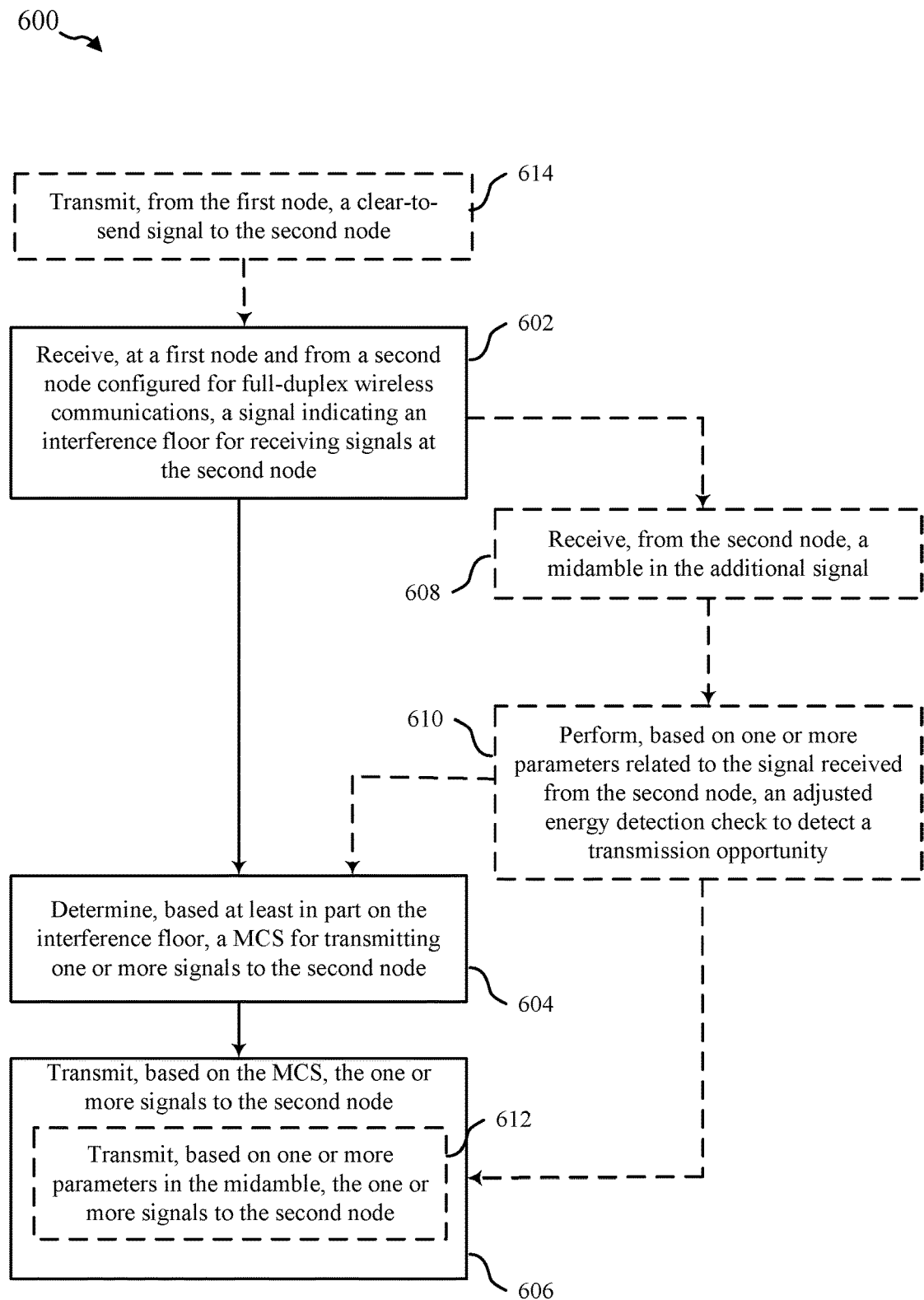
FIG. 6 illustrates an example of a flowchart for receiving signals indicating interference floor in accordance with the present disclosure.

FIGS. 5 and 6 are described in conjunction with one another herein, though the actions of the corresponding methods 500, 600 can be performed separately by separate components. In other words, performing of method 500 does not require additionally performing method 600 and vice versa.

FIG. 5 is a flowchart conceptually illustrating an example of a method 500 of wireless communication implemented by an AP for communicating in full-duplex, in accordance with aspects of the present disclosure. For an example, the method 500 is described below with reference to AP 105 of FIGS. 1, 2, and/or 3.

FIG. 6 is a flowchart conceptually illustrating an example of a method 600 of wireless communication implemented by a STA for communicating with a full-duplex AP, in accordance with aspects of the present disclosure. For an example, the method 600 is described below with reference to STA 115 of FIGS. 1, 2, and/or 4.

At block 502, the method 500 may include transmitting, to a first node, from a second node configured for full-duplex communications, a signal indicating an interference floor for receiving signals at the second node. In an aspect, interference floor component 352 can determine the interference floor at the AP 105 and can indicate the interference floor in a signal. Full-duplex communicating component 350, e.g., in conjunction with processor(s) 312, modem 314, memory 316, transceiver 302, etc., can transmit, to the first node (e.g., one or more STAs 115) from the second node (e.g., AP 105) configured for full-duplex communications, the signal indicating the interference floor for receiving the signals at the second node. For example, this can allow the STA 115 to select one or more parameters for transmitting communications to the AP 105, such as a MCS, to account for the interference the AP 105 causes to itself in communicating using full-duplex.

At block 602, the method 600 may include receiving, at a first node and from a second node configured for full-duplex wireless communications, a signal indicating an interference floor for receiving signals at the second node. In an aspect, communicating component 450, e.g., in conjunction with processor(s) 412, modem 414, memory 416, transceiver 402, etc., can receive, at the first node (e.g., the STA 115) and from the second node (e.g., AP 105) configured for full-duplex wireless communications, the signal indicating the interference floor for receiving signals at the second node. In an example, the signal may include a primary PPDU or other signal from the AP 105 that specifies the interference floor and/or other parameters that can be used for determining when and/or how to transmit signals to the AP 105. In one example, the signal can relate to transmitting over a data channel, and communicating component 450 can receive the signal from the AP 105 over another channel established between the AP 105 and STA 115. For example, this other channel can be an anchor channel that is established for communicating such indicators and/or channel feedback for the data channel between the AP 105 and STA 115. Thus, for example, based on receiving the indicator, communicating component 450 can activate the data channel for transmitting communications to, and/or receiving communications from, the AP 105.

At block 604, the method 600 may include determining, based at least in part on the interference floor, a MCS for transmitting one or more signals to the second node. In an aspect, interference floor determining component 452, e.g., in conjunction with processor(s) 412, modem 414, memory 416, transceiver 402, communicating component 450, etc., can determine, based at least in part on the interference floor, the MCS for transmitting one or more signals to the second node (e.g., the AP 105). For example, interference floor determining component 452 can determine the MCS that can allow the AP 105 to receive the and/or decode signals from the STA 115 when subject to the interference floor (e.g., where the interference floor can be a measurement of interference caused by the AP 105 in transmitting signals while receiving signals from the STA 115 in full-duplex). For example, the indicated interference floor may affect the signal-to-interference-and-noise ratio (SINR) of a packet received from STA 115, and thus interference floor determining component 452 can select an MCS to account for the potential SINR of the packet, which may include selecting a more basic MCS (e.g., binary phase shift keying (BPSK) for lower potential SINRs or more complex/efficient MCSs (e.g., quadrature phase shift keying (QPSK), 16-quadrature amplitude modulation (QAM), 64-QAM, 256-QAM, etc.) for higher potential SINRs.

At block 606, the method 600 may include transmitting, based on the MCS, the one or more signals to the second node. In an aspect, communicating component 450, e.g., in conjunction with processor(s) 412, modem 414, memory 416, transceiver 402, etc., can transmit, based on the MCS, the one or more signals to the second node (e.g., AP 105). For example, communicating component 450 can modulate or otherwise encode the one or more signals based on the MCS, and can transmit the one or more signals to the AP 105.

At block 504, the method 500 may include receiving, from the second node and based at least in part on the signal, one or more signals having an MCS selected based at least in part on the interference floor. In an aspect, full-duplex communicating component 350, e.g., in conjunction with processor(s) 312, modem 314, memory 316, transceiver 302, etc., can receive, from the first node (e.g., STA 115) and based at least in part on the signal, one or more signals having the MCS selected based at least in part on the interference floor. For example, the STA 115 can select the MCS to allow for the AP 105 to receive and decode the one or more signals though the AP 105 may also experience interference from its own transmitting in full-duplex mode.

In one example, the communicating component 450 of the STA 115, described in FIG. 4, may include an interference floor determining component 452 as well that performs similar functions to provide an interference floor and receive signals from an AP 105 based on the interference floor to allow for communicating using full-duplex. In one example, in this regard, communicating component 450 may be similar to and/or may include a full-duplex communicating component 350 as additionally described herein. In another example, full-duplex communicating component 350 may be similar to and/or may include a communicating component 450 as described herein in the STA 115, and thus may perform similar functions thereto in addition, or alternatively, to functions described above and further herein of the full-duplex communicating component 350.

In an example, where the AP 105 and STA 115 communicate according to the first configuration described above (where AP 105 is full-duplex and STA 115 is half-duplex), full-duplex communicating component 350 can transmit the signal indicating the interference floor as a trigger signal to facilitate triggering one or more STAs 115 to transmit communications to the AP 105. In this example, AP 105 can synchronize DL and UL access. Also, in this example, full-duplex communicating component 350 can transmit the trigger signal (or frame) using short interframe space (SIFS) time prior to a synchronized UL/DL transmission. STAs participating in the UL transmission need not be the same as the DL transmission, which can enable half-duplex STAs connected to the full-duplex AP 105. In this example, where one or more STAs are half-duplex, the trigger frame can identify one or more UL STAs, such as STA 115, that can transmit signals to the AP 105 while the AP 105 transmits signals to one or more DL STAs (e.g., where the DL STAs may be identified in a HE-SIG-B portion of the DL signals from the AP 105). For example, the HE-SIG-B portion can the high efficiency (HE) signal (SIG) B field as defined for HE PPDUs in IEEE 802.11 interfaces (e.g., IEEE 802.11ax).

In this example, the trigger frame may include the interference floor information, as described, which can allow for determining interference due to leakage from the transmitter 308 transmitting the signal that can be experienced by the receiver 306, which can affect the SINR of the packet received from the STA 115. The trigger frame may also include one or more other parameters, such as an indication as to whether the trigger frame (e.g., the corresponding PPDU) is a full-duplex transmission, an indication of whether a reverse transmission to be transmitted in response to the trigger frame, is limited to the receiving STA of the PPDU that is the trigger, which may simplify interference management at the AP 105, and/or other indications/parameters.

Figure 10:
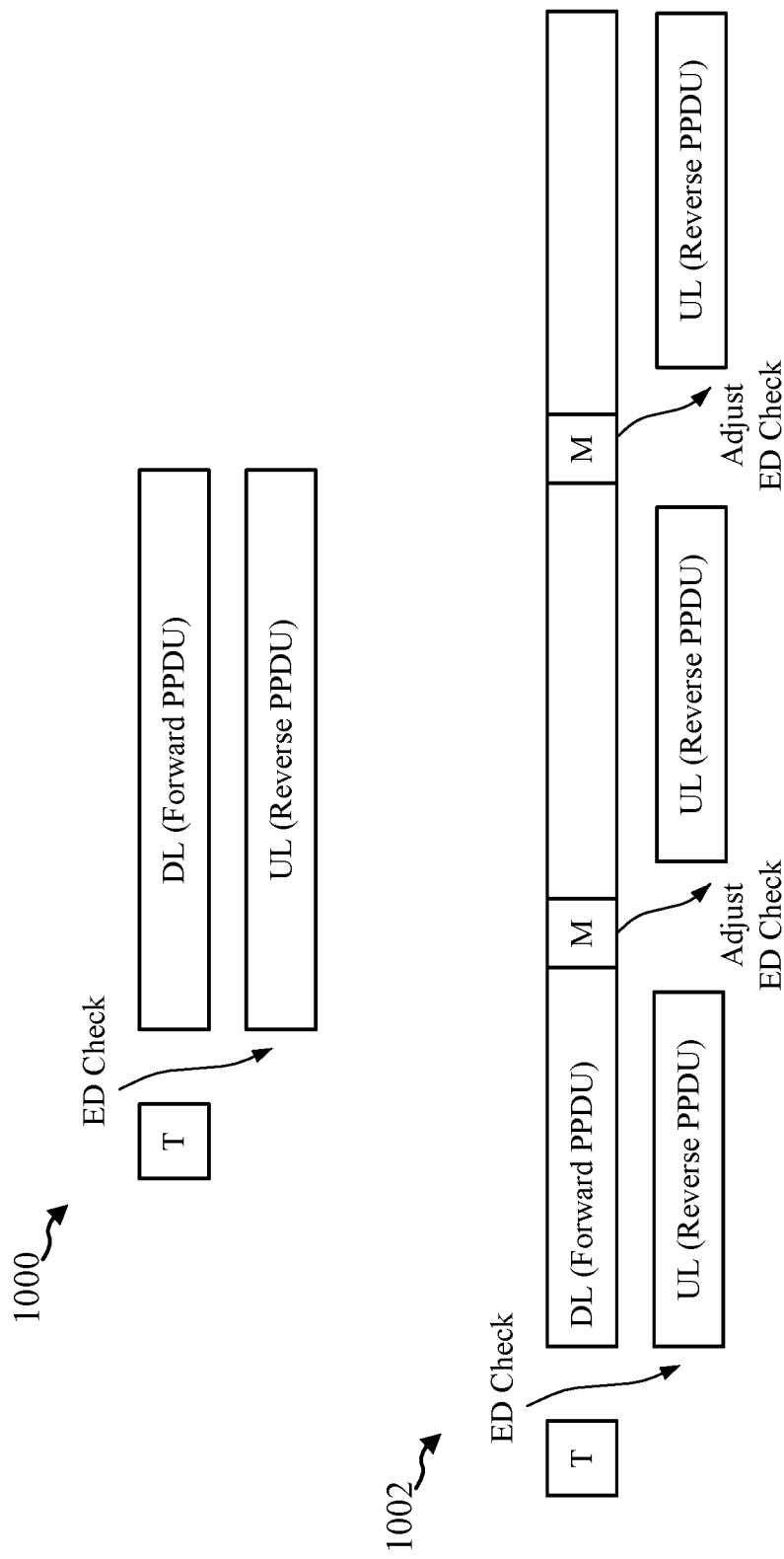
FIGS. 10-12 are schematic diagrams of examples of channel access sequences in accordance with aspects of the present disclosure.

An example is shown in FIG. 10, which illustrates various examples of channel access sequences 1000, 1002. Channel access sequence 1000 shows trigger frame T transmitted on the DL before the forward PPDU. Based on receiving trigger frame T (e.g., the signal from the AP 105, as described above), communicating component 450 can transmit the reverse PPDU on the UL (e.g., the one or more signals from the STA 115, as described above) while AP 105 also transmits the forward PPDU on the downlink in full-duplex communication, where the UL communication from the STA 115 and the downlink communication from the AP 105 may occur over the same channel, different channels that overlap or are neighboring or near to one another in frequency, etc. In addition, CCA component 456 may perform an energy detection (ED) check after receiving the trigger frame T to acquire the channel to transmit the reverse PPDU. The ED check should be low enough to acquire the channel based on AP 105 waiting a period of time between transmitting the trigger and transmitting the forward PPDU, which can enable the STA 115 to acquire the channel for additionally transmitting the reverse PPDU.

In addition, in this example, channel access may be provided to different STAs based on an indication by the AP 105, which may facilitate asynchronous DL and UL traffic. In this example, multiple reverse PPDUs can be transmitted by different STAs to the AP 105 during a single forward PPDU from the AP 105. In this example, the trigger frame can include information regarding the STAs that are triggered during the forward PPDU transmitted by full-duplex communicating component 350. Thus, communicating component 450 of multiple STAs 115 can receive the trigger frame, and can determine whether they are scheduled to receive signals in the forward PPDU transmitted by the AP 105. For example, the information in the trigger frame may allow for temporarily grouping STAs such that each group can concurrently send UL PPDUs. In another example, the information may include approximate start times for each group. In this example, STAs not scheduled (e.g., in a group or otherwise) can go into a sleep mode to conserve communication resources at least for the duration of the forward PPDU.

In this example, at optional block 506, the method 500 may include transmitting, to the first node, another signal including a midamble transmission to trigger transmission of the one or more signals by the first node. In an aspect, full-duplex communicating component 350, e.g., in conjunction with processor(s) 312, modem 314, memory 316, transceiver 302, etc., can transmit, to the first node (e.g., STA 115), another signal including a midamble transmission to trigger transmission of the one or more signals by the first node. For example, the midamble can be used as a short trigger to trigger each STA (or group of STAs) to help synchronize UL traffic, and can provide a more accurate time for transmitting the reverse PPDUs. Each midamble may include an identifier of a STA or group of STAs to transmit reverse PPDUs during the next opportunity.

In this example, at optional block 608, the method 600 may include receiving, from the second node, a midamble in the additional signal. In an aspect, communicating component 450, e.g., in conjunction with processor(s) 412, modem 414, memory 416, transceiver 402, etc., can receive, from the second node (e.g., AP 105), the midamble in the additional signal. For example, communicating component 450 can receive the midamble that identifies the STA 115, or group of STAs to which STA 115 belongs, scheduled to transmit a reverse PPDU in the next transmission opportunity. In one example, as described, STA 115 can remain in a normal power operation mode, or at least not a sleep mode, based on determining from the initial trigger frame that it is scheduled for transmitting in one or more transmission opportunities during the forward PPDU transmission by the AP 105. Communicating component 450 can receive the midamble during the forward PPDU and, based on receiving the midamble, can determine to transmit the one or more signals to the AP 105 while the AP 105 transmits the forward PPDU in full-duplex. In another example, communicating component 450 may receive, e.g., in the signal from the AP 105, an approximate time at which the midamble is transmitted, which may enable the STA 115 to monitor for the midamble near the time.

In this example, at optional block 610, the method 600 may include performing, based on one or more parameters related to the signal received from the second node, an adjusted energy detection check to detect a transmission opportunity. In an aspect, communicating component 450, e.g., in conjunction with processor(s) 412, modem 414, memory 416, transceiver 402, etc., can perform, based on the one or more parameters related to the signal received from the second node, the adjusted energy detection check to detect the transmission opportunity. Communicating component 450 can additionally perform the adjusted energy detection check based on receiving the midamble and/or based on determining to transmit one or more signals to the AP 105 in the next transmission opportunity. For example, communicating component 450 can adjust an energy detection threshold based on the interference floor to allow for acquiring the channel though AP 105 may be transmitting a downlink signal (e.g., the forward PPDU). Based on performing the energy detection check, communicating component 450 can transmit the one or more signals, which may or may not also include determining the MCS based on the interference floor, as described.

In this example, transmitting the one or more signals at block 606 may also optionally include, at optional block 612, transmitting, based on one or more parameters in the midamble, the one or more signals to the second node. In an aspect, communicating component 450, e.g., in conjunction with processor(s) 412, modem 414, memory 416, transceiver 402, etc., can transmit, based on one or more parameters in the midamble, the one or more signals to the second node (e.g., the AP 105). Thus, for example, communicating component 450, based on receiving the midamble, based on determining that the midamble identifies the STA 115 (e.g., in a group of STAs or otherwise) for transmitting a reverse PPDU after the midamble, and/or based on performing the adjusted energy detection check, can transmit the one or more signals to the AP 105.

An example is shown in FIG. 10, at channel access sequence 1002. In this example, the initial trigger frame T can identify multiple STAs, or groups of STAs (where each group can include one or more STA), to transmit one or more reverse PPDUs while AP 105 transmits a forward PPDU. The trigger frame T may identify some STAs for transmitting the reverse PPDU after the trigger frame, and others for transmitting reverse PPDUs after receiving the midamble M. The STAs identified for transmitting after the trigger frame can perform the energy detection check and being transmitting the reverse PPDU, as similarly described in channel access sequence 1000. The other STAs can await transmission of an appropriate midamble M, after which the identified STAs can perform an adjusted energy detection check to account for AP 105 transmitting the forward PPDU, and can then accordingly transmit the reverse PPDU, and so on.

In this example, receiving the one or more signals at block 504 may optionally include, at optional block 508, concurrently receiving one or more signals from one or more other nodes in performing the full-duplex communication. In an aspect, full-duplex communicating component 350, e.g., in conjunction with processor(s) 312, modem 314, memory 316, transceiver 302, etc., can concurrently receive the one or more signals from the one or more other nodes (e.g., one or more STAs) in performing the full-duplex communication. Thus, as described, this can include concurrently receiving reverse PPDUs from multiple STAs (e.g., a group of STAs) in a single transmission opportunity while also transmitting a forward PPDU, concurrently receiving reverse PPDUs from multiple STAs (or groups of STAs) in multiple transmission opportunities while also transmitting the forward PPDU, etc.

In another example, the STA can access the channel first to transmit to the AP 105 (e.g., without first receiving a forward PPDU from the AP 105), such as by using multi-user (MU) enhanced distributed channel access (EDCA). In this example, the AP 105 can use the transmission opportunity obtained by the STA to transmit a PPDU to another STA. In this example, the STA, after acquiring the channel, may send a clear-to-send (CTS) signal, or a variant thereof, which are generally referred to herein as XTS, to the AP 105 to allow the AP 105 to transmit a forward PPDU to one or more other STAs (e.g., using the same channel or link, a different channel or link that is overlapping, neighboring, or otherwise nearby in frequency, etc.).

In this example, at optional block 614, the method 600 may include transmitting, from the first node, a clear-to-send signal to the second node. In an aspect, CCA component 456, e.g., in conjunction with processor(s) 412, modem 414, memory 416, transceiver 402, communicating component 450, etc., can transmit, from the first node (e.g., STA 115), the clear-to-send signal to the second node (e.g., AP 105). In this example, at optional block 510, the method 500 may include receiving a clear-to-send signal from another node. In an aspect, full-duplex communicating component 350, e.g., in conjunction with processor(s) 312, modem 314, memory 316, transceiver 302, etc., can receive the CTS signal from another node (e.g., another STA), and can transmit the signal to the first STA (e.g., STA 115) and/or one or more additional STAs based on receiving the CTS signal. In this example, the downlink transmission can be synchronized with the uplink transmission. Moreover, in this example, the another STA can additionally transmit an UL transmission to the AP 105 at a SIFS time after sending the CTS signal or otherwise after acquiring the channel.

Figure 11:
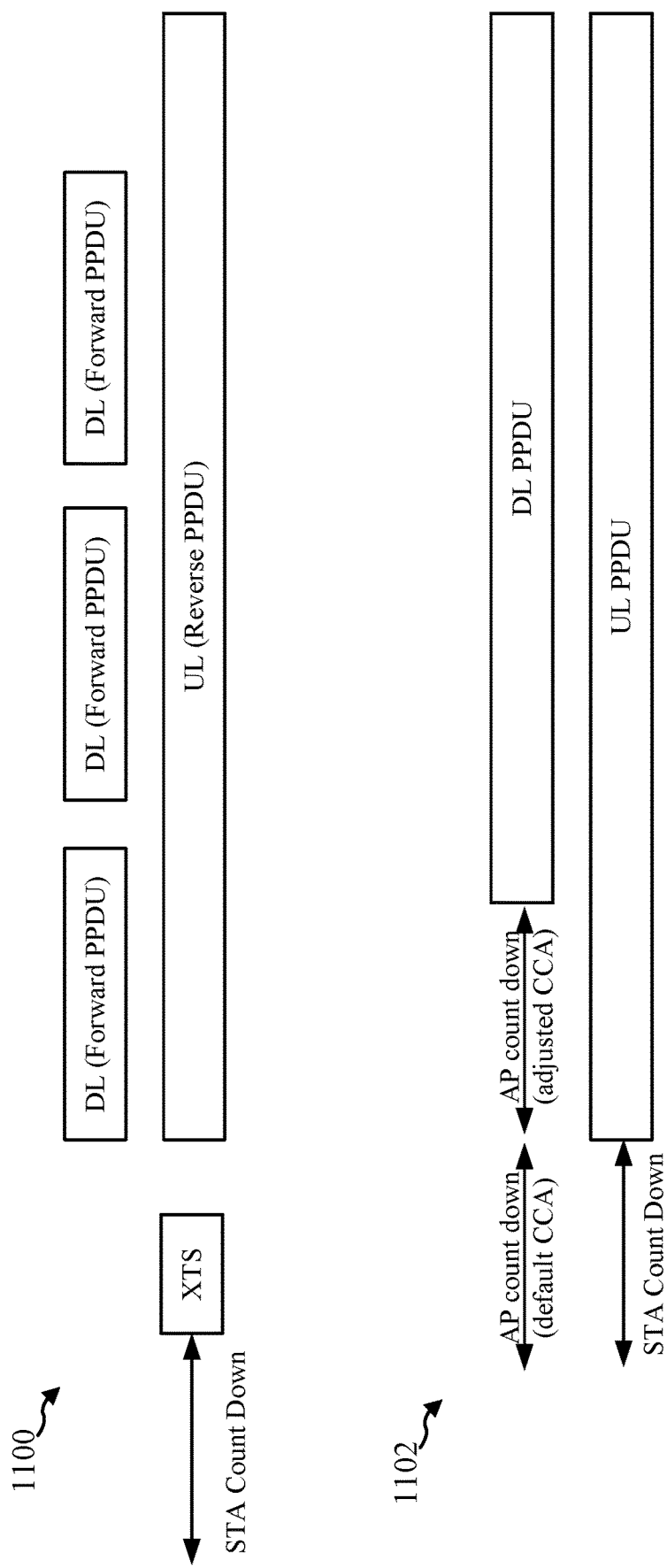

An example is shown in FIG. 11, at channel access sequence 1100. In this example, the STA can perform a STA countdown to acquire the channel, and then can transmit the XTS to the AP 105. The AP 105 can accordingly transmit one or more forward PPDUs (e.g., to other STAs 115 on the same channel or link, a different channel or link that is overlapping, neighboring, or otherwise nearby in frequency, etc.) while the STA that transmitted the XTS transmits a reverse PPDU to the AP 105 in full-duplex communication at the AP 105.

Figure 7:
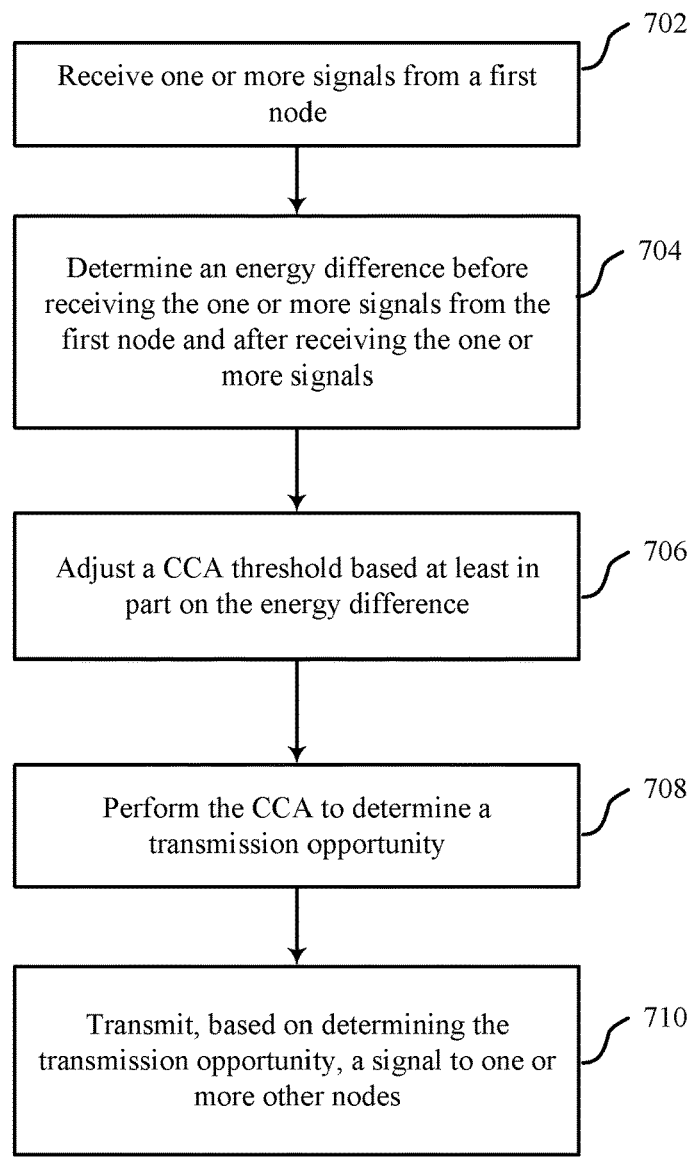
FIG. 7 illustrates an example of a flowchart for performing modified clear channel assessment (CCA) or energy detection (ED) in accordance with the present disclosure.

In another example, where the STA can access the medium first, the AP 105 can detect the transmission opportunity by the STA based on receiving the reverse PPDU from the STA. FIG. 7 is a flowchart conceptually illustrating an example of a method 700 of wireless communication that can be implemented by an AP for communicating in full-duplex based on detecting a transmission by a STA, in accordance with aspects of the present disclosure. For an example, the method 700 is described below with reference to AP 105 of FIGS. 1, 2, and/or 3.

At block 702, the method 700 may include receiving one or more signals from a first node. In an aspect, full-duplex communicating component 350, e.g., in conjunction with processor(s) 312, modem 314, memory 316, transceiver 302, etc., can receive the one or more signals from the first node (e.g., a STA). For example, the STA can acquire the channel (e.g., based on performing a CCA) and can begin transmitting an UL PPDU to the AP 105. In one example, full-duplex communicating component 350 can ensure the one or more signals are directed to the AP 105 before determining to use the transmission opportunity of the STA to transmit downlink signals to one or more other STAs in full-duplex communications.

At block 704, the method 700 may include determining an energy difference between before receiving the one or more signals from the first node and after receiving the one or more signals. In an aspect, energy difference determining component 354, e.g., in conjunction with processor(s) 312, modem 314, memory 316, transceiver 302, full-duplex communicating component 350, etc., can determine the energy difference between a time before receiving the one or more signals from the first node (e.g., the STA) and after receiving the one or more signals. For example, the energy difference can be determined based on detecting a received signal strength indicator (RSSI) of the one or more signals, and/or another measurement of energy (e.g., RSSI) taken before receiving the one or more signals.

At block 706, the method 700 may include adjusting a CCA threshold based at least in part on the energy difference. In an aspect, CCA component 356, e.g., in conjunction with processor(s) 312, modem 314, memory 316, transceiver 302, full-duplex communicating component 350, etc., can adjust the CCA threshold based at least in part on the energy difference. For example, CCA component 356 can adjust the threshold, for determining whether the channel is clear in performing CCA (e.g., and thus AP 105 can transmit over the channel) by an amount determined based on the energy difference (e.g., an amount of or in range related to the energy difference).

At block 708, the method 700 may include performing the CCA to determine a transmission opportunity. In an aspect, CCA component 356, e.g., in conjunction with processor(s) 312, modem 314, memory 316, transceiver 302, full-duplex communicating component 350, etc., can perform the CCA to determine the transmission opportunity. For example, CCA component 356 can perform the CCA based on the CCA threshold to determine the channel as clear though signals are transmitted by the STA on the same channel or link, a different channel or link that is overlapping, neighboring, or otherwise nearby in frequency, etc.) while the CCA component 356 is performing the CCA.

At block 710, the method 700 may include transmitting, based on determining the transmission opportunity, a signal to one or more other nodes. In an aspect, full-duplex communicating component 350, e.g., in conjunction with processor(s) 312, modem 314, memory 316, transceiver 302, etc., can transmit, based on determining the transmission opportunity, the signal to the one or more other nodes. For example, full-duplex communicating component 350 can transmit the signal to the one or more other STAs (e.g., over the same channel or link, a different channel or link that is overlapping, neighboring, or otherwise nearby in frequency, etc.) while receiving signals from the original STA from which the one or more signals were received at block 702.

An example is shown in FIG. 11, at channel access sequence 1102. In this example, the STA can perform a STA countdown to acquire the channel, and then can begin transmitting the UL PPDU to the AP 105. The AP 105 can have performed a countdown for CCA and did not acquire the channel (e.g., same channel or link, a different channel or link that is overlapping, neighboring, or otherwise nearby in frequency, etc.) based on the STA acquiring the channel and transmitting the UL PPDU. The AP 105 can detect and receive the UL PPDU from the STA, and can perform the adjusted CCA, as described above, to account for the energy difference from the UL PPDU received from the STA. If the adjusted CCA succeeds, the AP 105 can transmit DL PPDU to one or more other STAs while receiving the UL PPDU from the initial STA in full-duplex communications.

In another example, a similar procedure can be performed by the STA 115 to use a transmission opportunity of the AP 105 to transmit an UL PPDU to the AP 105 while the AP 105 is transmitting DL PPDU to other STAs (e.g., where the STA 115 is half-duplex). In this example, the AP 105 may not necessarily schedule the STAs, and the STAs can transmit to the APs 105 when the channel is acquired, which may include acquiring the channel though the AP 105 is using the channel to transmit to other STAs. In this example, the STA 115 can similarly use the method 700 of FIG. 7.

At block 702, the method 700 may include receiving one or more signals from a first node. In an aspect, communicating component 450, e.g., in conjunction with processor(s) 412, modem 414, memory 416, transceiver 402, etc., can receive the one or more signals from the first node (e.g., AP 105). For example, the AP 105 can acquire the channel (e.g., based on performing a CCA) and can begin transmitting a DL PPDU to one or more other STAs. In one example, communicating component 450 can ensure the AP 105 transmitting the DL PPDU is the AP 105 to which the STA 115 is connected for transmitting UL PPDUs. Moreover, in this example, communicating component 450 can ensure the AP 105 is capable of receiving UL PPDUs when transmitting DL PPDUs (e.g., that the AP 105 is capable of full-duplex communications).

At block 704, the method 700 may include determining an energy difference between before receiving the one or more signals from the first node and after receiving the one or more signals. In an aspect, energy difference determining component 454, e.g., in conjunction with processor(s) 412, modem 414, memory 416, transceiver 402, communicating component 450, etc., can determine the energy difference between a time before receiving the one or more signals from the first node (e.g., the AP 105) and after receiving the one or more signals. For example, the energy difference can be determined based on detecting a received signal strength indicator (RSSI) of the one or more signals, and/or another measurement of energy (e.g., RSSI) taken before receiving the one or more signals.

At block 706, the method 700 may include adjusting a CCA threshold based at least in part on the energy difference. In an aspect, CCA component 456, e.g., in conjunction with processor(s) 412, modem 414, memory 416, transceiver 402, communicating component 450, etc., can adjust the CCA threshold based at least in part on the energy difference. For example, CCA component 456 can adjust the threshold, for determining whether the channel is clear and thus STA 115 can transmit over the channel, by an amount determined based on the energy difference (e.g., an amount of or in range related to the energy difference).

At block 708, the method 700 may include performing the CCA to determine a transmission opportunity. In an aspect, CCA component 456, e.g., in conjunction with processor(s) 412, modem 414, memory 416, transceiver 402, communicating component 450, etc., can perform the CCA to determine the transmission opportunity. For example, CCA component 456 can perform the CCA based on the CCA threshold to determine the channel as clear though signals are transmitted by the AP 105.

At block 710, the method 700 may include transmitting, based on determining the transmission opportunity, a signal to one or more other nodes. In an aspect, communicating component 450, e.g., in conjunction with processor(s) 412, modem 414, memory 416, transceiver 402, etc., can transmit, based on determining the transmission opportunity, the signal to the one or more other nodes. For example, full-duplex communicating component 450 can transmit the signal to the AP 105 while the AP 105 transmits signals to other STAs.

Figure 12:
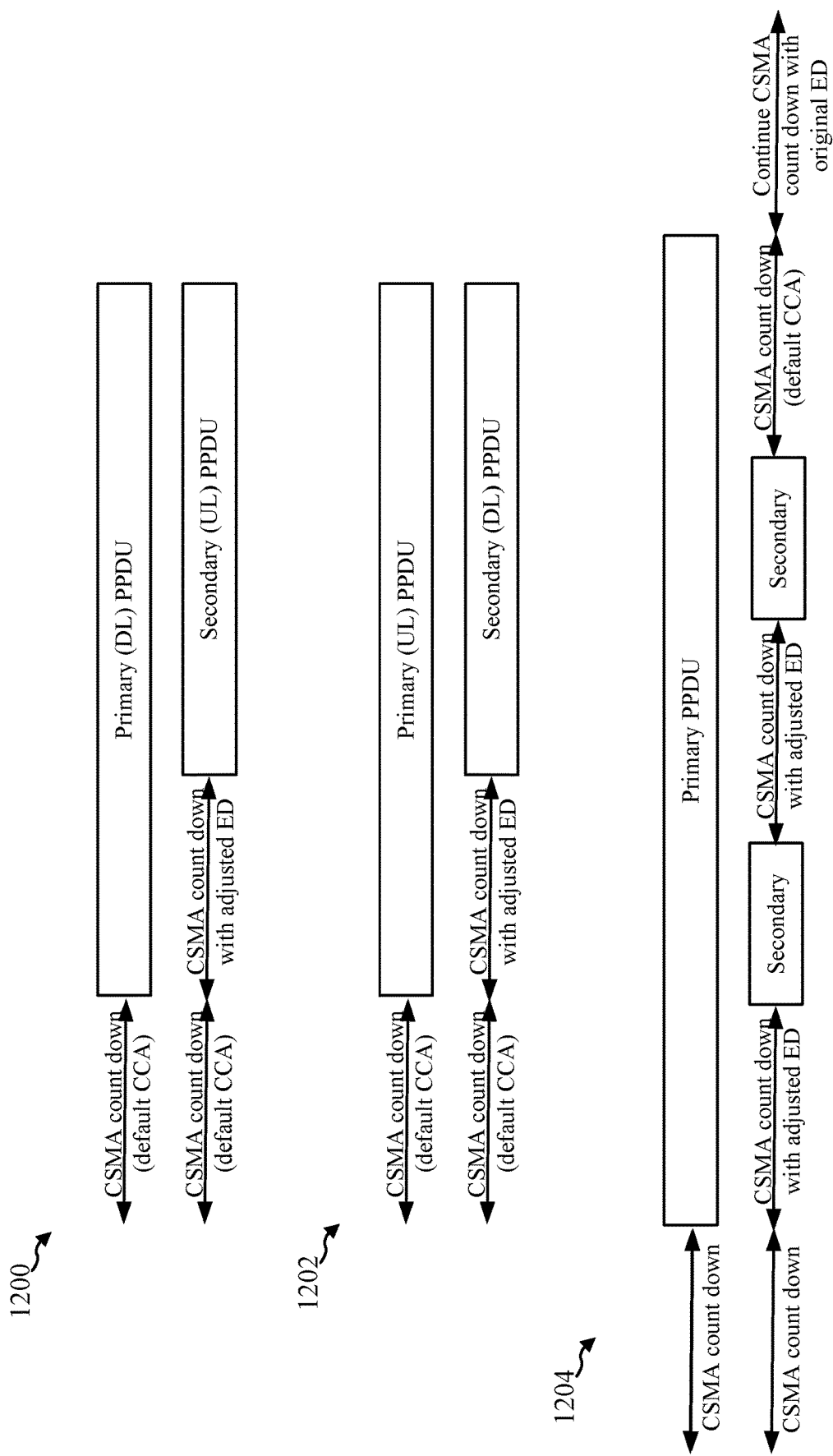

An example is shown in FIG. 12, at channel access sequence 1200. In this example, the AP can perform a carrier sense multiple access (CSMA) countdown to acquire the channel, and then can begin transmitting the DL PPDU to one or more STAs. The STA 115 can have performed a CSMA countdown for CCA and did not acquire the channel based on the AP acquiring the channel and transmitting the DL PPDU. The STA 115 can detect and receive the DL PPDU from the AP 105, and can perform the adjusted CCA, as described above, to account for the energy difference from the DL PPDU received from the AP 105. If the adjusted CCA succeeds, the STA 115 can transmit the UL PPDU to the AP 105 while the AP transmit DL PPDU to one or more STAs in full-duplex communications. As shown in channel access sequence 1202, a similar procedure can be used where the STA 115 transmits the UL PPDU first, as described above.

In another example, where the STA 115 is configured for full-duplex, method 500 in FIG. 5 can be performed by the STA 115 and/or method 600 in FIG. 6 can be performed by the AP 105. In this example, as described, STA 115 may include a full-duplex communicating component 350, and/or components thereof, instead of or in addition to the communicating component 450, and/or AP 105 may include a communicating component 450, and/or components thereof, instead of or in addition to the full-duplex communicating component 350.

Thus, for example, the full-duplex communicating component 350 at a STA 115 can transmit a signal indicating an interference floor at the STA 115, which can allow the AP 105 to select an MCS for transmitting one or more signals back to the STA 115 that considers the interference caused at a receiver 406 of the STA 115 by signals transmitted via transmitter 408 of the STA 115. This can allow the STA 115 to receive, process, decode, etc. signals from the AP 105 that are received while the STA 115 is transmitting signals to the AP 105 in full-duplex communications over the same channel or link or a different channel or link that is overlapping, neighboring, or otherwise nearby in frequency, etc.). For example, full-duplex communicating component 350 at a STA 115 can include the interference floor information in a header of a packet transmitted to the AP 105. In another example, full-duplex communicating component 350 of a STA 115 can indicate, in the header of the forward PPDU, a target RSSI for a reverse PPDU from the AP 105. Thus, a communicating component 450 of the AP 105 can receive the forward PPDU from the STA 115, determine the RSSI, and transmit the reverse PPDU at the target RSSI to allow the STA 115 to receive the reverse PPDU when it is also transmitting signals to the AP 105. Moreover, the full-duplex communicating component 350 of the STA 115, in this example, can include an indication of whether a full-duplex transmission is allowed from the AP 105, an indication of whether the secondary transmission in response to the forward PPDU Is allowed only by the recipient of the forward PPDU, etc., as described above with respect to the full-duplex AP 105. In addition, in this example, the full-duplex communicating component 350 of the STA 115 can send a secondary transmission to the transmit address of the forward PPDU based on parameters specified in the forward PPDU header and if the STA 115 acquires the channel during CCA based on adjusting the energy detection threshold, as described above (e.g., with reference to FIG. 12).

In addition, in an example where the STA 115 (e.g., in half-duplex or full-duplex) can transmit to the AP 105 without a trigger frame, multiple reverse PPDUs (e.g., from STAs 115) can be transmitted during a single forward PPDU, and thus, as described, at optional block 508, the full-duplex communicating component 350 can concurrently receive one or more signals from one or more other nodes. For example, STAs 115 that are sending reverse PPDUs can receive the forward PPDU from the AP 105, and can use the adjusted energy detection for the CSMA countdown during the forward PPDU, as shown in channel access sequence 1204 in FIG. 12. In addition, however, the STA 115 can similarly include the full-duplex communicating component 350 that sends the forward PPDU, and the AP 105 performs the CSMA countdown based on an adjusted energy detection and sends the reverse PPDU to the STA 115, as described.

Figure 8:
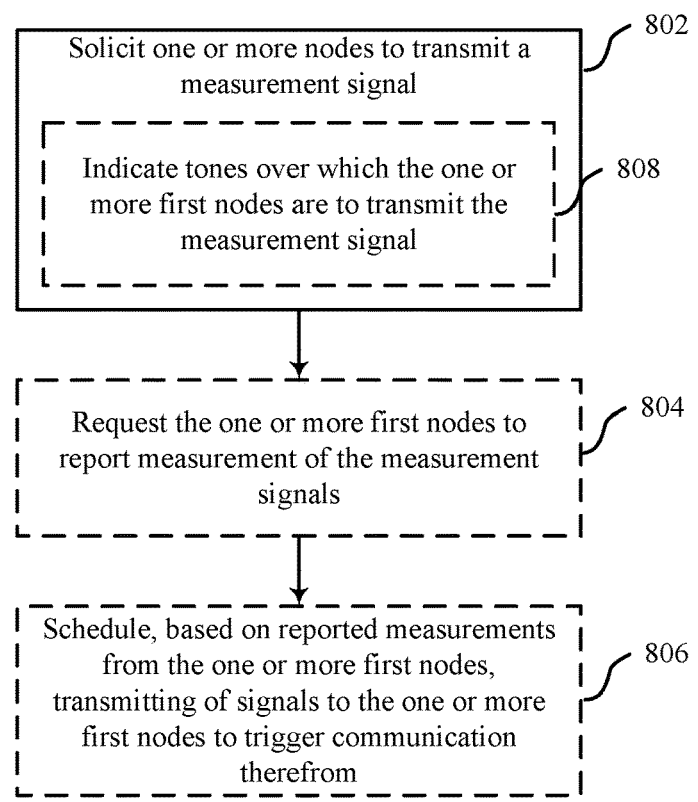
FIG. 8 illustrates an example of a flowchart for soliciting measurement reports in accordance with the present disclosure.
Figure 9:
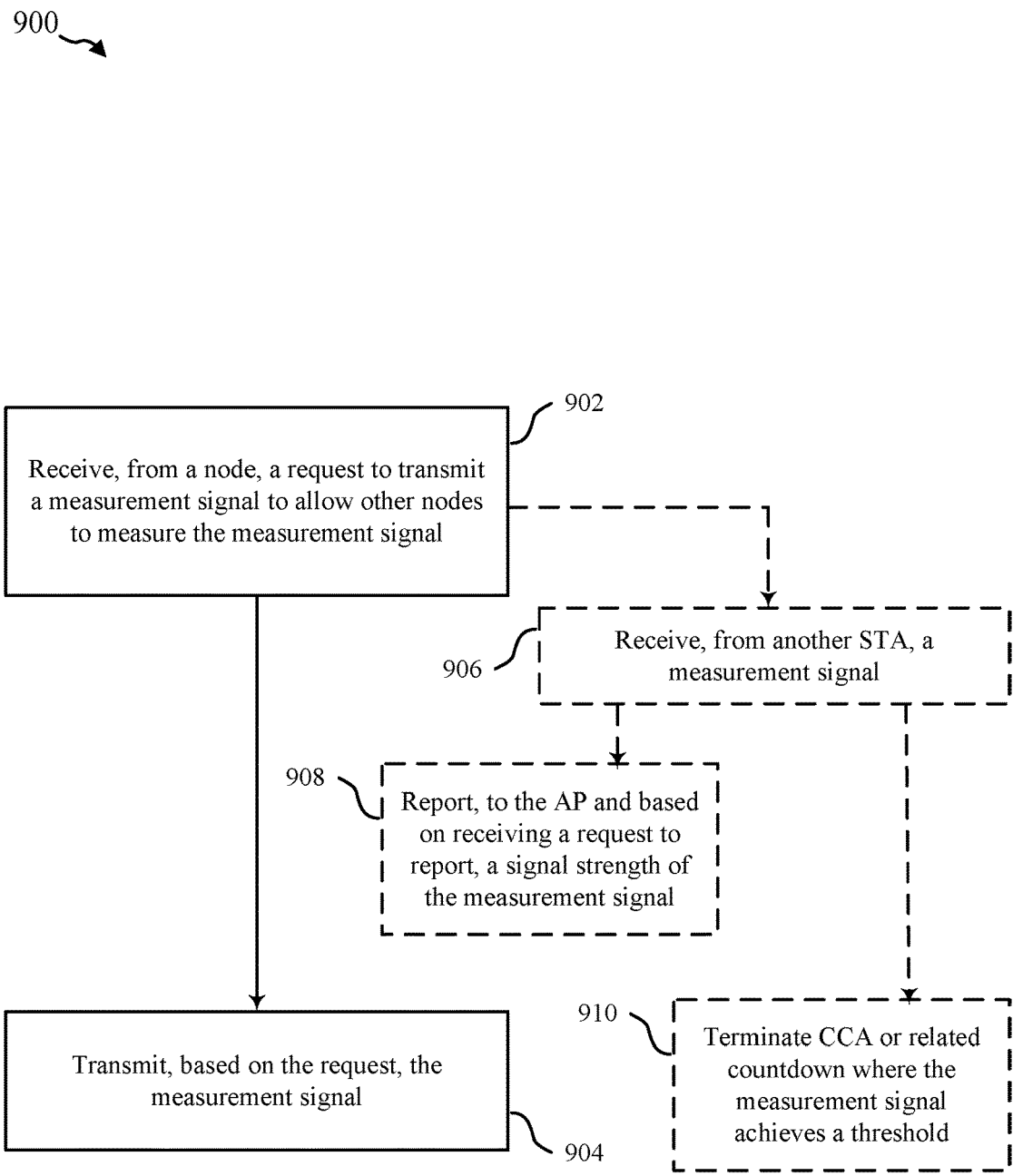
FIG. 9 illustrates an example of a flowchart for transmitting measurement signals and/or reporting signal measurements in accordance with the present disclosure.

FIGS. 8 and 9 are described in conjunction with one another herein, though the actions of the corresponding methods 800, 900 can be performed separately by separate components. In other words, performing of method 800 does not require additionally performing method 900 and vice versa. In an example, an uplink transmission from a STA to an AP can cause significant interference to another STA in the same BSS that is receiving downlink data from the AP. Thus, the AP can identify the group of STAs that can be served together. Various examples of sequences are explained below for scheduling transmission of measurement signals and/or reporting of the measured signals.

FIG. 8 is a flowchart conceptually illustrating an example of a method 800 of wireless communication implemented by an AP for soliciting measurement signal transmission and/or measure signal reporting, in accordance with aspects of the present disclosure. For an example, the method 800 is described below with reference to AP 105 of FIGS. 1, 2, and/or 3.

FIG. 9 is a flowchart conceptually illustrating an example of a method 900 of wireless communication implemented by a STA for transmitting measurement signals and/or measuring measurement signals of other STAs, in accordance with aspects of the present disclosure. For an example, the method 900 is described below with reference to STA 115 of FIGS. 1, 2, and/or 4.

At block 802, the method 800 may include soliciting one or more nodes to transmit a measurement signal. In an aspect, measurement soliciting component 358, e.g., in conjunction with processor(s) 312, modem 314, memory 316, transceiver 302, full-duplex communicating component 350, etc., can solicit the one or more nodes (e.g., one or more STAs) to transmit a measurement signal. In an example, measurement soliciting component 358 can solicit multiple STAs to transmit measurement signals at different periods of time to mitigate interference that may otherwise be caused by the STAs transmitting measurement signals at the same time.

At block 902, the method 900 may include receiving, from a node, a request to transmit a measurement signal to allow other nodes to measure the measurement signal. In an aspect, measuring component 458, e.g., in conjunction with processor(s) 412, modem 414, memory 416, transceiver 402, communicating component 450, etc., can receive, from the node (e.g., AP 105) a request to transmit a measurement signal to allow other nodes to measure the measurement signal. In one example, the measurement signal may indicate a period of time and/or frequency resources over which to transmit the measurement signal. Moreover, the measurement signal can correspond to a reference signal, CTS, a null data packet (NDP) signal (e.g., with tones selected from long training field (LTF)) or substantially any type of signal that the STA can transmit to facilitate measuring to determine one or more parameters regarding a wireless communication environment.

At block 904, the method 900 may include transmitting, based on the request, the measurement signal. In an aspect, communicating component 450, e.g., in conjunction with processor(s) 412, modem 414, memory 416, transceiver 402, etc., can transmit, based on the request, the measurement signal. This can include communicating component 450 transmitting the measurement signal over time and/or frequency resources indicated in the request from the AP 105 and/or based on one or more other parameters that may be indicated in the request. This can cause other STAs to receive and measure the measurement signals and/or report measurements back to the AP 105.

In this regard, at optional block 906, the method 900 may optionally include receiving, from another STA, a measurement signal. In an aspect, communicating component 450, e.g., in conjunction with processor(s) 412, modem 414, memory 416, transceiver 402, etc., can receive, from another STA, the measurement signal. In one example, measuring component 458 can receive (e.g., from AP 105 that causes measurement signals to be transmitted) information regarding resources over which measurement signals are transmitted, and can accordingly attempt to receive the measurement signals over the resources.

At optional block 908, the method 900 may optionally include reporting, to the AP and based on receiving a request to report, a signal strength of the measurement signal. In an aspect, measuring component 458, e.g., in conjunction with processor(s) 412, modem 414, memory 416, transceiver 402, communicating component 450, etc., can report, to the AP (e.g., AP 105) and based on receiving a request to report (e.g., from the AP 105), a signal strength of the measurement signal. In one example, measuring component 458 can report multiple measurements of multiple measurement signals received from multiple STAs. As described, this can be based on a request from the AP 105, and the AP 105 can use the measurements to facilitate managing interference in scheduling the STAs for communications.

Thus, at optional block 804, the method 800 may optionally include requesting the one or more first nodes to report measurement of the measurement signals. In an aspect, measurement soliciting component 358, e.g., in conjunction with processor(s) 312, modem 314, memory 316, transceiver 302, full-duplex communicating component 350, etc., can request the one or more first nodes to report measurement of the measurement signals. For example, measurement soliciting component 358 can transmit the request to the one or more STAs and/or may include the request in an initial solicitation to request the STAs to transmit a measurement signal. In one example, measurement soliciting component 358 can indicate resources over which the STAs are to transmit measurement signals, and each STA can use this information to determine resources over which to transmit a measurement signal and other resources over which to measure measurement signals from other STAs.

Optionally, at block 806, the method 800 may optionally include scheduling, based on reported measurements from the one or more first nodes, transmitting of signals to the one or more first nodes to trigger communication therefrom. In an aspect, full-duplex communicating component 350, e.g., in conjunction with processor(s) 312, modem 314, memory 316, transceiver 302, etc., can schedule, based on reported measurements from the one or more first nodes, transmitting of signals to the one or more first nodes to trigger communication therefrom. For example, full-duplex communicating component 350 can use the reported measurements in transmitting forward PPDUs to the STAs, as described above, to additionally cause the STAs to transmit reverse PPDUs to the AP 105 (e.g., using midambles to schedule the STAs, or groups of stays, using separate forward PPDUs to schedule the STAs, or groups of STAs, and/or the like).

Figure 13:
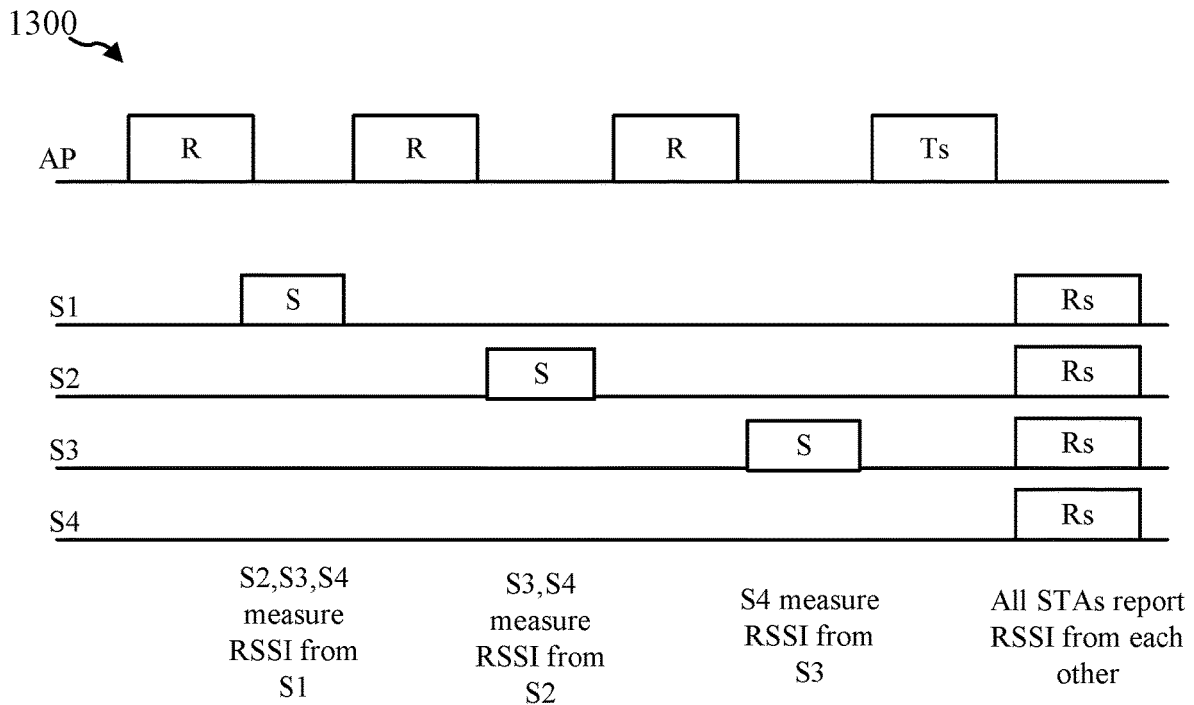
FIGS. 13-14 are schematic diagrams of examples of communication timelines for performing signal measurements in accordance with aspects of the present disclosure.
Figure 13:
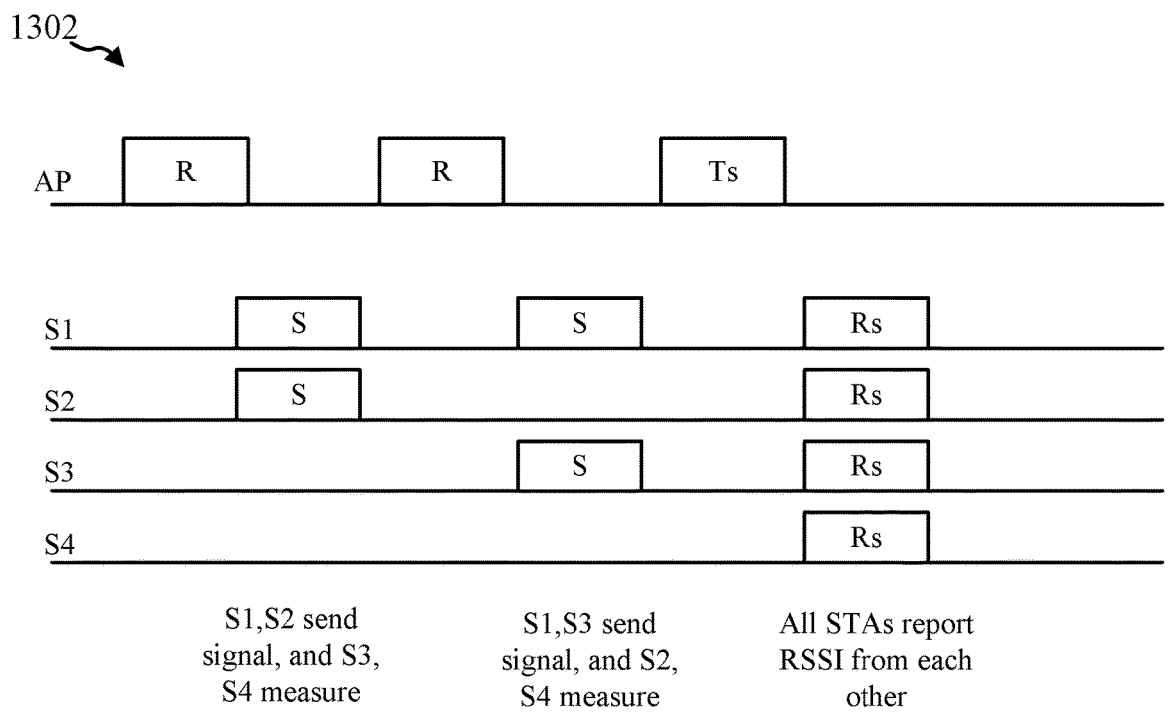

An example is shown in FIG. 13, which illustrates an example of a timeline 1300 over which an AP 105 can request various STAs 115 to transmit measurement signals. For example, AP 105 can request (R) STA S1 to transmit a measurement signal and can separately request (R) STA S2 and then STA S3 to also transmit measurement signals. In this example, STAs S2, S3, S4 can measure the measurement signal (S) transmitted by STA S1, STAs S1, S3, S4 can measure the measurement signal (S) transmitted by STA S2, and STAs S1, S2, S4 can measure the measurement signal (S) transmitted by STA S3. The AP requests (Ts) the STAs to transmit measurement information, and the STAs S1, S2, S3, and S4 can transmit (Rs) measurement information (e.g., RSSI of the measurement signals) to the AP during a similar period of time.

In another example, at optional block 808, the method 800 may optionally include (e.g., in soliciting the one or more nodes to transmit the measurement signal) indicating tones over which the one or more first nodes are to transmit the measurement signal. In an aspect, measurement soliciting component 358, e.g., in conjunction with processor(s) 312, modem 314, memory 316, transceiver 302, full-duplex communicating component 350, etc., can indicate tones over which the one or more first nodes are to transmit the measurement signal. This can allow the STAs to transmit measurement signals over orthogonal tones using similar time resources to conserve overall resources used for transmitting the measurement signals.

An example is shown in FIG. 13, which illustrates an example of a timeline 1302 over which an AP 105 can request various STAs 115 to transmit measurement signals. For example, AP 105 can request (R) STAs S1 and S2 to transmit measurement signals over orthogonal resources and can separately request (R) STAs S1 and S3 to transmit measurement signals over subsequent orthogonal resources, and the request (R) may indicate the frequency resources (e.g., tones) over which the STAs are to transmit the measurement signals. In this example, STAs S3, S4 can measure the measurement signals (S) transmitted by STAs S1 and S2, and STAs S2, S4 can measure the measurement signal (S) transmitted by STAs S1, S3. In one example, the orthogonal tones can be selected from wide tones to avoid frequency selectivity. The AP requests (Ts) the STAs to transmit measurement information, and the STAs S1, S2, S3, and S4 can transmit (Rs) measurement information (e.g., RSSI of the measurement signals) to the AP during a similar period of time.

As described, however, the AP 105 may not schedule communications from the STAs, and thus a STA can determine to transmit without causing interference to other STAs based on the AP 105 requesting the STAs to transmit pool messages. In this example, at optional block 910, the method 900 may optionally include terminating a CCA or related countdown where the measurement signal achieves a threshold. In an aspect, CCA component 456, e.g., in conjunction with processor(s) 412, modem 414, memory 416, transceiver 402, communicating component 450, etc., can terminate the CCA or related countdown where the measurement signal achieves a threshold. In this example, communicating component 450 can receive a poll message from an AP 105 and can respond by transmitting the measurement signal. The STA measures measurement signals of other STAs and can terminate a CCA or related countdown for transmitting to the AP 105 where the measurement signal from another STA achieves a threshold (e.g., a threshold RSSI).

Figure 14:
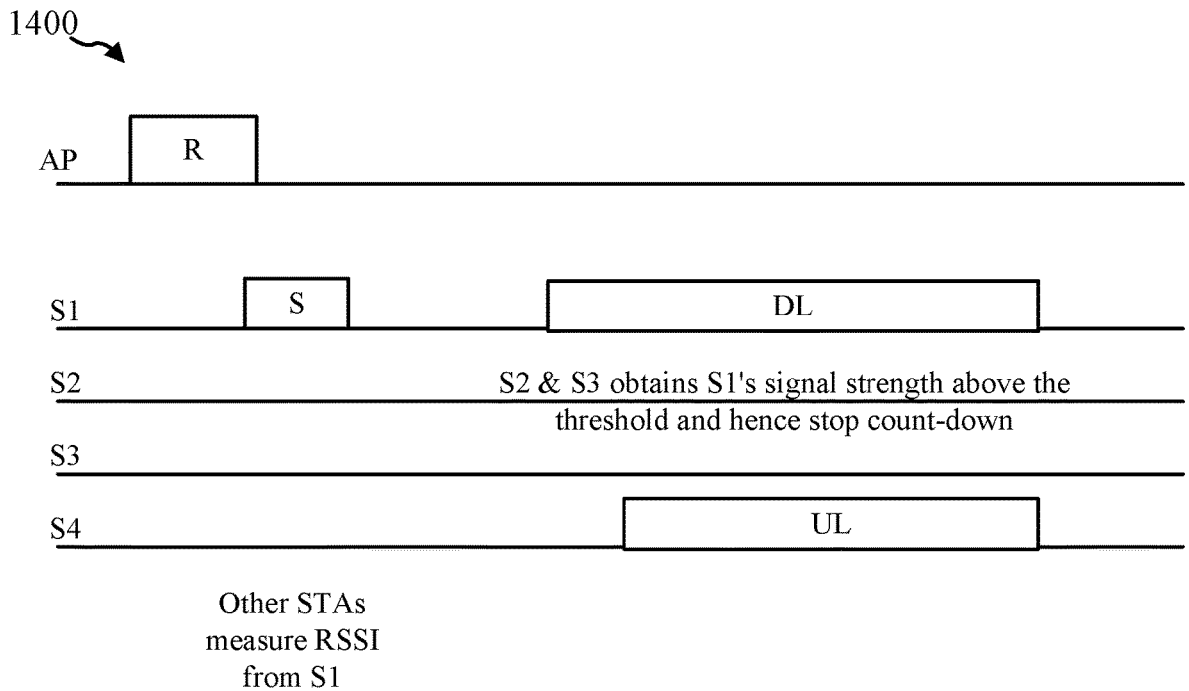
Figure 14:
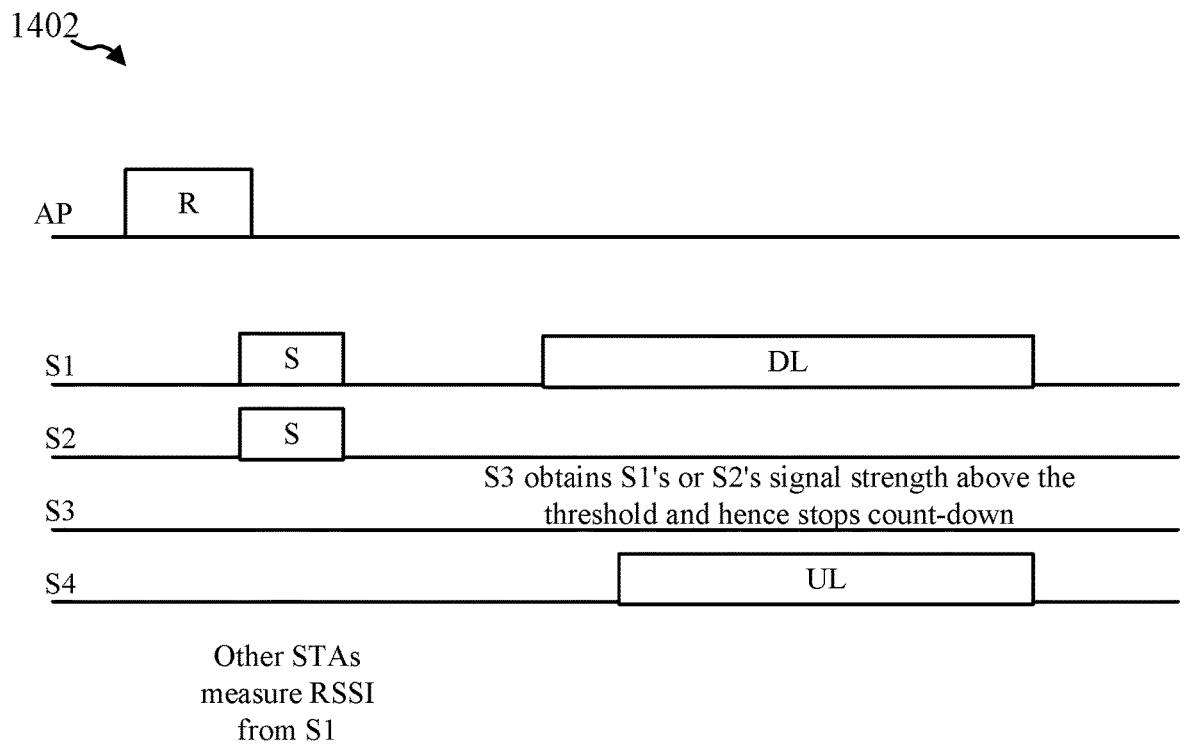

An example is shown in FIG. 14, which illustrates an example of a timeline 1400 over which an AP 105 can request various STAs 115 to transmit measurement signals. For example, AP 105 can request (R) STA S1 to transmit a measurement signal. In this example, STA S1 can transmit the measurement signal (S), which can be measured by STAs S2, S3, S4. STAs S2 and S3 can receive the measurement signal (S) from STA S1, can determine that the signal strength achieves a threshold, and can thus stop CCA or related countdown. The AP 105 can transmit the DL PPDU to S1 and S4 can transmit an UL PPDU to the AP 105 based on determining the signal strength of (S) from STA S1 did not achieve the threshold.

In another example, as similarly described above, the AP 105 can indicate orthogonal resources over which STAs can transmit measurement signals. An example is shown in FIG. 14, which illustrates an example of a timeline 1402 over which an AP 105 can request various STAs 115 to transmit measurement signals. For example, AP 105 can request (R) STAs S1 and S2 to transmit measurement signals over orthogonal frequency resources. In this example, STAs S1 and S2 can transmit measurement signals (S), which can be measured by STAs S3, S4. STA S3 can receive the measurement signals (S) from STAs S1 and S2, can determine that the signal strength of either signal achieves a threshold, and can thus stop CCA or related countdown. The AP 105 can transmit the DL PPDU to S1 and S4 can transmit an UL PPDU to the AP 105 based on determining the signal strength of (S) from STAs S1 and/or S2 did not achieve the threshold.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
  a transceiver;
  a memory configured to store instructions; and
  one or more processors communicatively coupled with the transceiver and the memory, wherein the one or more processors are configured to:
    receive, from a node configured for full-duplex wireless communications, a signal to trigger the apparatus to transmit data to the node, wherein the signal includes an interference floor indication, wherein the interference floor indication is based on measurement of interference caused by a transmitter of the node to signals received at the node;

determine, based at least in part on the interference floor indication, a modulation and coding scheme (MCS) for transmitting one or more signals to the node; and transmit, based on the MCS and in response to receiving the signal to trigger the apparatus to transmit the data to the node, the data in the one or more signals to the node.

2. The apparatus of claim 1, wherein the one or more processors are configured to receive the signal as a frame at least a short interframe space (SIFS) time prior to transmitting the one or more signals to the node, wherein transmitting the one or more signals to the node is part of a synchronized uplink/downlink transmission including the apparatus transmitting the one or more signals while the node transmits one or more other signals.

3. The apparatus of claim 1, wherein the signal further indicates at least one of one or more first nodes, including the apparatus, that are to transmit one or more signals to the node in response to the signal or whether the apparatus is the only apparatus to transmit the one or more signals to the node in response to the signal.

4. The apparatus of claim 1, wherein the signal further indicates whether a subsequent physical layer convergence procedure (PLCP) protocol data unit (PPDU) transmission by the node is a full-duplex communication.

5. The apparatus of claim 4, wherein the one or more processors are configured to transmit the one or more signals to the node concurrently with the node transmitting the subsequent PPDU transmission in performing the full-duplex communication.

6. The apparatus of claim 4, wherein the one or more processors are configured to transmit the one or more signals to the node over a first link concurrently with the node transmitting the subsequent PPDU transmission in performing the full-duplex communication over a second link.

7. The apparatus of claim 4, wherein the one or more processors are further configured to receive a midamble during the subsequent protocol data unit PPDU transmission that identifies one or more nodes, including the apparatus, for transmitting one or more signals to the node in a next transmission opportunity, wherein the one or more processors are configured to transmit the one or more signals to the node based at least in part on receiving the midamble.

8. The apparatus of claim 7, wherein the signal further indicates an approximate time for receiving the midamble.

9. The apparatus of claim 8, wherein the one or more processors are configured to receive the subsequent PPDU transmission based on performing an adjusted energy detection check, adjusted based on receiving the signal from the node, at a SIFS interval between receiving the midamble and transmitting the one or more signals.

10. The apparatus of claim 4, wherein the one or more processors are configured to receive the subsequent PPDU transmission based on performing an energy detection check at a SIFS interval between receiving the signal and transmitting the one or more signals.

11. The apparatus of claim 1, wherein the one or more processors are further configured to transmit, before transmitting the one or more signals to the node, a clear-to-send signal indicating that the node can transmit during a period of time when the apparatus transmits the one or more signals and/or one or more additional nodes transmits one or more additional signals to the node.

12. The apparatus of claim 1, wherein the one or more processors are further configured to:

receive, from the node, a request to transmit a measurement signal to allow other first nodes to measure the measurement signal;

transmit, based on the request, the measurement signal.

13. The apparatus of claim 1, wherein the apparatus is a mobile station (STA) and the node is an access point (AP), and wherein the one or more processors are further configured to:

receive, from another STA, a measurement signal;

measure a signal strength of the measurement signal; and report, to the AP and based on receiving a request to report the signal strength of one or more measurement signals, the signal strength of the measurement signal.

14. The apparatus of claim 13, wherein the one or more processors are further configured to transmit a different measurement signal for measuring by another STA.

15. The apparatus of claim 14, wherein the request indicates tones over which the STA is to send the different measurement signal, wherein the one or more processors are configured to transmit the different measurement signal based on the tones.

16. The apparatus of claim 1, wherein the signal comprises a physical layer convergence procedure (PLCP) protocol data unit (PPDU) transmission by the node, wherein the PPDU includes a PPDU header that includes the interference floor indication.

17. The apparatus of claim 16, wherein the one or more processors are further configured to:

determine an energy difference before the PPDU transmission is received from the node and after the PPDU transmission is received from the node;

adjust a clear channel assessment threshold based at least in part on the energy difference and an uplink energy difference caused by the one or more signals to be transmitted to the node;

perform, based on the clear channel assessment threshold, a clear channel assessment to determine a transmission opportunity, wherein the one or more processors are configured to transmit the one or more signals based at least in part on determining the transmission opportunity and on one or more parameters in the PPDU header.

18. The apparatus of claim 16, wherein the PPDU header further indicates whether full-duplex communications are allowed when receiving the one or more signals from the apparatus, wherein the one or more processors are configured to transmit the one or more signals based on determining that the full-duplex communications are allowed.

19. The apparatus of claim 16, wherein the PPDU header further indicates whether the apparatus is the only apparatus to transmit the one or more signals to the node in response to the signal.

20. The apparatus of claim 16, wherein the one or more processors are configured to transmit the one or more signals based at least in part on determining that measurement signals received from one or more other first nodes do not achieve a threshold.

21. An apparatus for wireless communication, comprising:

a transceiver;

a memory configured to store instructions; and one or more processors communicatively coupled with the transceiver and the memory, wherein the one or more processors are configured to:

transmit, based on a configuration for full-duplex wireless communications and to a first node, a signal to trigger the first node to transmit data to the apparatus, wherein the signal indicates an interference floor indication, wherein the interference floor indication is based on a measurement of interference caused by a transmitter of the transceiver to signals received at the apparatus; and receive, from the first node and in response to the first node receiving the signal to trigger the first node to transmit data to the apparatus, the data in one or more signals having a modulation and coding scheme (MCS) selected based at least in part on the interference floor indication.

22. The apparatus of claim 21, wherein the one or more processors are configured to transmit the signal as a frame at least a short interframe space (SIFS) time prior to receiving the one or more signals from the first node, wherein receiving the one or more signals from the first node is part of a synchronized uplink/downlink transmission including the apparatus transmitting one or more other signals while the first node transmits the one or more signals.

23. The apparatus of claim 21, wherein the signal further indicates at least one of one or more first nodes, including the first node, that are to transmit one or more signals to the apparatus in response to the signal, or whether the first node is the only first node to transmit the one or more signals to the apparatus in response to the signal.

24. The apparatus of claim 21, wherein the signal further indicates whether a subsequent physical layer convergence procedure (PLCP) protocol data unit (PPDU) transmission by the apparatus is a full-duplex communication.

25. The apparatus of claim 24, wherein the one or more processors are configured to receive the one or more signals from the first node concurrently with the one or more processors transmitting the subsequent PPDU transmission in performing the full-duplex communication.

26. The apparatus of claim 24, wherein the one or more processors are configured to receive the one or more signals from the first node over a first link concurrently with the one or more processors transmitting the subsequent PPDU transmission over a second link in performing the full-duplex communication.

27. The apparatus of claim 24, wherein the one or more processors are further configured to receive one or more other signals from one or more other first nodes concurrently with the one or more processors transmitting the subsequent PPDU transmission in performing the full-duplex communication.

28. The apparatus of claim 24, wherein the one or more processors are further configured to receive one or more other signals from one or more other first nodes over a first link concurrently with the one or more processors transmitting the subsequent PPDU transmission over a second link in performing the full-duplex communication.

29. The apparatus of claim 24, wherein the one or more processors are further configured to transmit a midamble during the subsequent protocol data unit PPDU transmission to trigger transmission of the one or more signals by the first node.

30. The apparatus of claim 29, wherein the signal further indicates an approximate time for receiving the midamble.

31. The apparatus of claim 29, wherein the one or more processors are further configured to transmit multiple midambles during the subsequent protocol data unit PPDU transmission to trigger transmission of one or more other signals by one or more other first nodes.

32. The apparatus of claim 21, wherein the one or more processors are further configured to:

determine an energy difference before the one or more signals are received from the first node and after the one or more signals are received from the first node;

adjust a clear channel assessment threshold based at least in part on the energy difference;

perform, based on the clear channel assessment threshold, a clear channel assessment to determine a transmission opportunity; and transmit, based at least in part on determining the transmission opportunity, a protocol data unit (PDU) transmission to one or more first nodes.

33. The apparatus of claim 21, wherein the one or more processors are further configured to:

receive a clear-to-send signal from the first node; and transmit, based at least in part on receiving the clear-to-send signal, a physical layer convergence procedure (PLCP) protocol data unit (PPDU) transmission to one or more first nodes.

34. The apparatus of claim 21, wherein the one or more processors are further configured to:

solicit one or more first nodes, including the first node, to transmit a measurement signal;

request the one or more first nodes to report measurement of measurement signals from one or more other nodes; and schedule, based on reported measurements from the one or more first nodes, transmitting of signals to the one or more first nodes to trigger communications from the one or more first nodes.

35. The apparatus of claim 34, wherein the one or more processors are configured to solicit the one or more first nodes to transmit the measurement signal at least in part by indicating tones over which each of the one or more first nodes are to transmit the measurement signal.

36. The apparatus of claim 21, wherein the signal comprises a physical layer convergence procedure (PLCP) protocol data unit (PPDU) transmission by the apparatus, wherein the PPDU includes a header that includes the interference floor indication.

37. The apparatus of claim 36, wherein the header further indicates whether full-duplex communications are allowed when receiving the one or more signals from the first node, wherein the one or more processors are configured to transmit the one or more signals based on determining that the full-duplex communications are allowed.

38. The apparatus of claim 36, wherein the header further indicates whether the first node is the only first node to transmit the one or more signals to the apparatus in response to the signal.

39. The apparatus of claim 36, wherein the one or more processors are configured to transmit the one or more signals based at least in part on determining that measurement signals received from one or more other first nodes do not achieve a threshold.

40. A method for wireless communication, comprising:

receiving, at a first node and from a second node configured for full-duplex wireless communications, a signal to trigger the first node to transmit data to the second node, wherein the signal indicates an interference floor indication, wherein the interference floor indication is based on a measurement of interference caused by a transmitter of the second node to signals received at the second node;

determining, by the first node and based at least in part on the interference floor indication, a modulation and coding scheme (MCS) for transmitting one or more signals to the second node; and transmitting, by the first node, in response to receiving the signal to trigger the first node to transmit the data to the second node, and based on the MCS, the data in the one or more signals to the second node.

41. A method for wireless communication, comprising:
transmitting, from a second node configured for full-duplex wireless communications and to a first node, a signal to trigger the first node to transmit data to the second node, wherein the signal indicates an interference floor indication, wherein the interference floor indication is based on a measurement of interference caused by a transmitter of the second node to signals received at the second node; and
receiving, from the first node and in response to the first node receiving the signal to trigger the first node to transmit data to the second node, the data in one or more signals having a modulation and coding scheme (MCS) selected based at least in part on the interference floor indication.

* * * * *